US011653271B2

(12) United States Patent
Ryu et al.

(10) Patent No.: US 11,653,271 B2
(45) Date of Patent: May 16, 2023

(54) CONFIGURABLE ANNOUNCEMENTS IN A NETWORK

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Franklin Park, NJ (US); Tao Luo, San Diego, CA (US); Jing Sun, San Diego, CA (US); Xiaoxia Zhang, San Diego, CA (US); Xiaojie Wang, Hillsborough, NJ (US); Peter Gaal, San Diego, CA (US); Juan Montojo, San Diego, CA (US); Ozcan Ozturk, San Diego, CA (US); Arumugam Chendamarai Kannan, San Diego, CA (US); Jelena Damnjanovic, Del Mar, CA (US); Piyush Gupta, Bridgewater, NJ (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/148,223

(22) Filed: Jan. 13, 2021

(65) Prior Publication Data
US 2022/0225173 A1 Jul. 14, 2022

(51) Int. Cl.
*H04W 28/26* (2009.01)
*H04W 8/24* (2009.01)
(Continued)

(52) U.S. Cl.
CPC ............. *H04W 28/26* (2013.01); *H04W 8/24* (2013.01); *H04W 72/0406* (2013.01);
(Continued)

(58) Field of Classification Search
CPC ......... H04W 72/1205; H04W 72/0446; H04W 28/26; H04W 8/24; H04W 72/0406; H04W 72/0453; H04W 92/18
See application file for complete search history.

(56) References Cited

U.S. PATENT DOCUMENTS

2019/0320415 A1\* 10/2019 Seo ....................... H04W 76/15
2020/0367278 A1  11/2020 Hosseini et al.
(Continued)

OTHER PUBLICATIONS

Interdigital Inc: "Resource Allocation for NR V2X", 3GPP RAN WG1 Meeting #95, 3GPP Draft, R1-1813164 (R16 V2X WI AI72414 Resource Allocation), 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018, Nov. 11, 2018 (Nov. 11, 2018), XP051555157, pp. 1-9, Retrieved from the Internet: URL: http://www.3gpp.org/ftp/Meetings%5F3GPP%5FSYNC/RAN1/Docs/R1%2D1813164%2Ezip [retrieved on Nov. 11, 2018] paragraph [0002], p. 4-p. 9, figures 3-4.
(Continued)

*Primary Examiner* — Raj Jain
(74) *Attorney, Agent, or Firm* — QUALCOMM Incorporated

(57) ABSTRACT

Various aspects of the present disclosure generally relate to wireless communication. In some aspects, a wireless communication device may transmit an announcement that indicates a plurality of future resource reservations. The wireless communication device may transmit multiple sets of announcements that indicate one or more reservations and may vary the transmission frequency thereof based on proximity to the communications. The wireless communication device may transmit an announcement that indicates a future communication and a cancellation indication that indicates a cancellation of the communication. The wireless
(Continued)

communication device may transmit a preemption indication that indicates that resources reserved for an announced future communication have been preempted for another communication. Numerous other aspects are described.

30 Claims, 13 Drawing Sheets

(51) Int. Cl.
　　*H04W 72/04*　　　(2009.01)
　　*H04W 72/12*　　　(2009.01)
　　*H04W 72/0446*　　(2023.01)
　　*H04W 72/0453*　　(2023.01)

(52) U.S. Cl.
　　CPC ... *H04W 72/0446* (2013.01); *H04W 72/0453* (2013.01); *H04W 72/1205* (2013.01)

(56) References Cited

U.S. PATENT DOCUMENTS

| | | | |
|---|---|---|---|
| 2021/0105104 A1* | 4/2021 | Cao | H04L 1/1896 |
| 2022/0022204 A1* | 1/2022 | Fehrenbach | H04W 72/1205 |
| 2022/0095280 A1* | 3/2022 | Farag | H04W 72/1215 |
| 2022/0116942 A1* | 4/2022 | Fouad | H04W 56/0015 |
| 2022/0225173 A1* | 7/2022 | Ryu | H04W 72/02 |

OTHER PUBLICATIONS

International Search Report and Written Opinion—PCT/US2022/070137—ISA/EPO—dated May 11, 2022.

\* cited by examiner

CONFIGURABLE ANNOUNCEMENTS IN A NETWORK

FIELD OF THE DISCLOSURE

Aspects of the present disclosure generally relate to wireless communication and to techniques and apparatuses for configurable announcements in a network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a wireless communication device includes transmitting a reception announcement that indicates a plurality of future resource reservations; and receiving at least one communication from an additional wireless communication device using at least one of the plurality of future resource reservations.

In some aspects, a method of wireless communication performed by a wireless communication device includes receiving a reception announcement that indicates a plurality of future resource reservations; and communicating with an additional wireless communication device using a set of selected resources based at least in part on the plurality of future resource reservations.

In some aspects, a method of wireless communication performed by a wireless communication device includes transmitting, during a first time period and using a first transmission frequency, a first set of announcements associated with at least one future communication, wherein the at least one future communication corresponds to at least one scheduled time; and transmitting, during a second time period and using a second transmission frequency that is different than the first transmission frequency, a second set of announcements associated with the at least one future communication, wherein the second transmission frequency is based at least in part on an amount of time between the second time period and the at least one scheduled time.

In some aspects, a method of wireless communication performed by a wireless communication device includes receiving, during a first time period and using a first transmission frequency, a first set of announcements associated with at least one future communication, wherein the at least one future communication corresponds to at least one scheduled time; and receiving, during a second time period and using a second transmission frequency that is different than the first transmission frequency, a second set of announcements associated with the at least one future communication, wherein the second transmission frequency is based at least in part on an amount of time between the second time period and the at least one scheduled time.

In some aspects, a method of wireless communication performed by a first wireless communication device includes transmitting an announcement associated with a future communication and that indicates a reservation of a set of resources associated with the future communication; and transmitting a cancellation indication corresponding to the announcement, wherein the cancellation indication indicates that the future communication will not occur.

In some aspects, a method of wireless communication performed by a first wireless communication device includes receiving an announcement associated with a future communication and that indicates a reservation of a set of resources associated with the future communication; and receiving a cancellation indication corresponding to the announcement, wherein the cancellation indication indicates that the future communication will not occur.

In some aspects, a method of wireless communication performed by a first wireless communication device includes transmitting an announcement that indicates a reservation of a set of resources associated with a future communication between the first wireless communication device and a second wireless communication device; and transmitting a preemption indication corresponding to the announcement, wherein the preemption indication indicates that the future communication will not occur.

In some aspects, a method of wireless communication performed by a first wireless communication device includes receiving an announcement that indicates a reservation of a set of resources associated with a future communication between the first wireless communication device and a second wireless communication device; and receiving a preemption indication corresponding to the announcement, wherein the preemption indication indicates that the future communication will not occur.

In some aspects, a wireless communication device for wireless communication includes a memory; and one or more processors operatively coupled to the memory, the memory and the one or more processors configured to: transmit a reception announcement that indicates a plurality of future resource reservations; and receive at least one communication from an additional wireless communication device using at least one of the plurality of future resource reservations.

In some aspects, a wireless communication device for wireless communication includes a memory; and one or more processors operatively coupled to the memory, the memory and the one or more processors configured to: receive a reception announcement that indicates a plurality of future resource reservations; and communicate with an additional wireless communication device using a set of selected resources based at least in part on the plurality of future resource reservations.

In some aspects, a wireless communication device for wireless communication includes a memory; and one or more processors operatively coupled to the memory, the memory and the one or more processors configured to: transmit, during a first time period and using a first transmission frequency, a first set of announcements associated with at least one future communication, wherein the at least one future communication corresponds to at least one scheduled time; and transmit, during a second time period and using a second transmission frequency that is different than the first transmission frequency, a second set of announcements associated with the at least one future communication, wherein the second transmission frequency is based at least in part on an amount of time between the second time period and the at least one scheduled time.

In some aspects, a wireless communication device for wireless communication includes a memory; and one or more processors operatively coupled to the memory, the memory and the one or more processors configured to: receive, during a first time period and using a first transmission frequency, a first set of announcements associated with at least one future communication, wherein the at least one future communication corresponds to at least one scheduled time; and receive, during a second time period and using a second transmission frequency that is different than the first transmission frequency, a second set of announcements associated with the at least one future communication, wherein the second transmission frequency is based at least in part on an amount of time between the second time period and the at least one scheduled time.

In some aspects, a first wireless communication device for wireless communication includes a memory; and one or more processors operatively coupled to the memory, the memory and the one or more processors configured to: transmit an announcement associated with a future communication and that indicates a reservation of a set of resources associated with the future communication; and transmit a cancellation indication corresponding to the announcement, wherein the cancellation indication indicates that the future communication will not occur.

In some aspects, a first wireless communication device for wireless communication includes a memory; and one or more processors operatively coupled to the memory, the memory and the one or more processors configured to: receive an announcement associated with a future communication and that indicates a reservation of a set of resources associated with the future communication; and receive a cancellation indication corresponding to the announcement, wherein the cancellation indication indicates that the future communication will not occur.

In some aspects, a first wireless communication device for wireless communication includes a memory; and one or more processors operatively coupled to the memory, the memory and the one or more processors configured to: transmit an announcement that indicates a reservation of a set of resources associated with a future communication between the first wireless communication device and a second wireless communication device; and transmit a preemption indication corresponding to the announcement, wherein the preemption indication indicates that the future communication will not occur.

In some aspects, a first wireless communication device for wireless communication includes a memory; and one or more processors operatively coupled to the memory, the memory and the one or more processors configured to: receive an announcement that indicates a reservation of a set of resources associated with a future communication between the first wireless communication device and a second wireless communication device; and receive a preemption indication corresponding to the announcement, wherein the preemption indication indicates that the future communication will not occur.

In some aspects, a non-transitory computer-readable medium storing a set of instructions for wireless communication includes one or more instructions that, when executed by one or more processors of a wireless communication device, cause the wireless communication device to: transmit a reception announcement that indicates a plurality of future resource reservations; and receive at least one communication from an additional wireless communication device using at least one of the plurality of future resource reservations.

In some aspects, a non-transitory computer-readable medium storing a set of instructions for wireless communication includes one or more instructions that, when executed by one or more processors of a wireless communication device, cause the wireless communication device to: receive a reception announcement that indicates a plurality of future resource reservations; and communicate with an additional wireless communication device using a set of selected resources based at least in part on the plurality of future resource reservations.

In some aspects, a non-transitory computer-readable medium storing a set of instructions for wireless communication includes one or more instructions that, when executed by one or more processors of a wireless communication device, cause the wireless communication device to: transmit, during a first time period and using a first transmission frequency, a first set of announcements associated with at least one future communication, wherein the at least one future communication corresponds to at least one scheduled time; and transmit, during a second time period and using a second transmission frequency that is different than the first transmission frequency, a second set of announcements associated with the at least one future communication, wherein the second transmission frequency is based at least in part on an amount of time between the second time period and the at least one scheduled time.

In some aspects, a non-transitory computer-readable medium storing a set of instructions for wireless communication includes one or more instructions that, when executed by one or more processors of a wireless communication device, cause the wireless communication device to: receive, during a first time period and using a first transmission frequency, a first set of announcements associated with at least one future communication, wherein the at least one future communication corresponds to at least one scheduled time; and receive, during a second time period and using a second transmission frequency that is different than the first transmission frequency, a second set of announcements associated with the at least one future communication, wherein the second transmission frequency is based at least in part on an amount of time between the second time period and the at least one scheduled time.

In some aspects, a non-transitory computer-readable medium storing a set of instructions for wireless communication includes one or more instructions that, when executed by one or more processors of a first wireless communication device, cause the first wireless communication device to: transmit an announcement associated with a future communication and that indicates a reservation of a set of resources associated with the future communication; and transmit a cancellation indication corresponding to the announcement, wherein the cancellation indication indicates that the future communication will not occur.

In some aspects, a non-transitory computer-readable medium storing a set of instructions for wireless communication includes one or more instructions that, when executed by one or more processors of a first wireless communication device, cause the first wireless communication device to: receive an announcement associated with a future communication and that indicates a reservation of a set of resources associated with the future communication; and receive a cancellation indication corresponding to the announcement, wherein the cancellation indication indicates that the future communication will not occur.

In some aspects, a non-transitory computer-readable medium storing a set of instructions for wireless communication includes one or more instructions that, when executed by one or more processors of a first wireless communication device, cause the first wireless communication device to: transmit an announcement that indicates a reservation of a set of resources associated with a future communication between the first wireless communication device and a second wireless communication device; and transmit a preemption indication corresponding to the announcement, wherein the preemption indication indicates that the future communication will not occur.

In some aspects, a non-transitory computer-readable medium storing a set of instructions for wireless communication includes one or more instructions that, when executed by one or more processors of a first wireless communication device, cause the first wireless communication device to: receive an announcement that indicates a reservation of a set of resources associated with a future communication between the first wireless communication device and a second wireless communication device; and receive a preemption indication corresponding to the announcement, wherein the preemption indication indicates that the future communication will not occur.

In some aspects, an apparatus for wireless communication includes means for transmitting a reception announcement that indicates a plurality of future resource reservations; and means for receiving at least one communication from an additional wireless communication device using at least one of the plurality of future resource reservations.

In some aspects, an apparatus for wireless communication includes means for receiving a reception announcement that indicates a plurality of future resource reservations; and means for communicating with an additional wireless communication device using a set of selected resources based at least in part on the plurality of future resource reservations.

In some aspects, an apparatus for wireless communication includes means for transmitting, during a first time period and using a first transmission frequency, a first set of announcements associated with at least one future communication, wherein the at least one future communication corresponds to at least one scheduled time; and means for transmitting, during a second time period and using a second transmission frequency that is different than the first transmission frequency, a second set of announcements associated with the at least one future communication, wherein the second transmission frequency is based at least in part on an amount of time between the second time period and the at least one scheduled time.

In some aspects, an apparatus for wireless communication includes means for receiving, during a first time period and using a first transmission frequency, a first set of announcements associated with at least one future communication, wherein the at least one future communication corresponds to at least one scheduled time; and means for receiving, during a second time period and using a second transmission frequency that is different than the first transmission frequency, a second set of announcements associated with the at least one future communication, wherein the second transmission frequency is based at least in part on an amount of time between the second time period and the at least one scheduled time.

In some aspects, an apparatus for wireless communication includes means for transmitting an announcement associated with a future communication and that indicates a reservation of a set of resources associated with the future communication; and means for transmitting a cancellation indication corresponding to the announcement, wherein the cancellation indication indicates that the future communication will not occur.

In some aspects, an apparatus for wireless communication includes means for receiving an announcement associated with a future communication and that indicates a reservation of a set of resources associated with the future communication; and means for receiving a cancellation indication corresponding to the announcement, wherein the cancellation indication indicates that the future communication will not occur.

In some aspects, an apparatus for wireless communication includes means for transmitting an announcement that indicates a reservation of a set of resources associated with a future communication between the first wireless communication device and a second wireless communication device; and means for transmitting a preemption indication corresponding to the announcement, wherein the preemption indication indicates that the future communication will not occur.

In some aspects, an apparatus for wireless communication includes means for receiving an announcement that indicates a reservation of a set of resources associated with a future communication between the first wireless communication device and a second wireless communication device; and means for receiving a preemption indication corresponding to the announcement, wherein the preemption indication indicates that the future communication will not occur.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
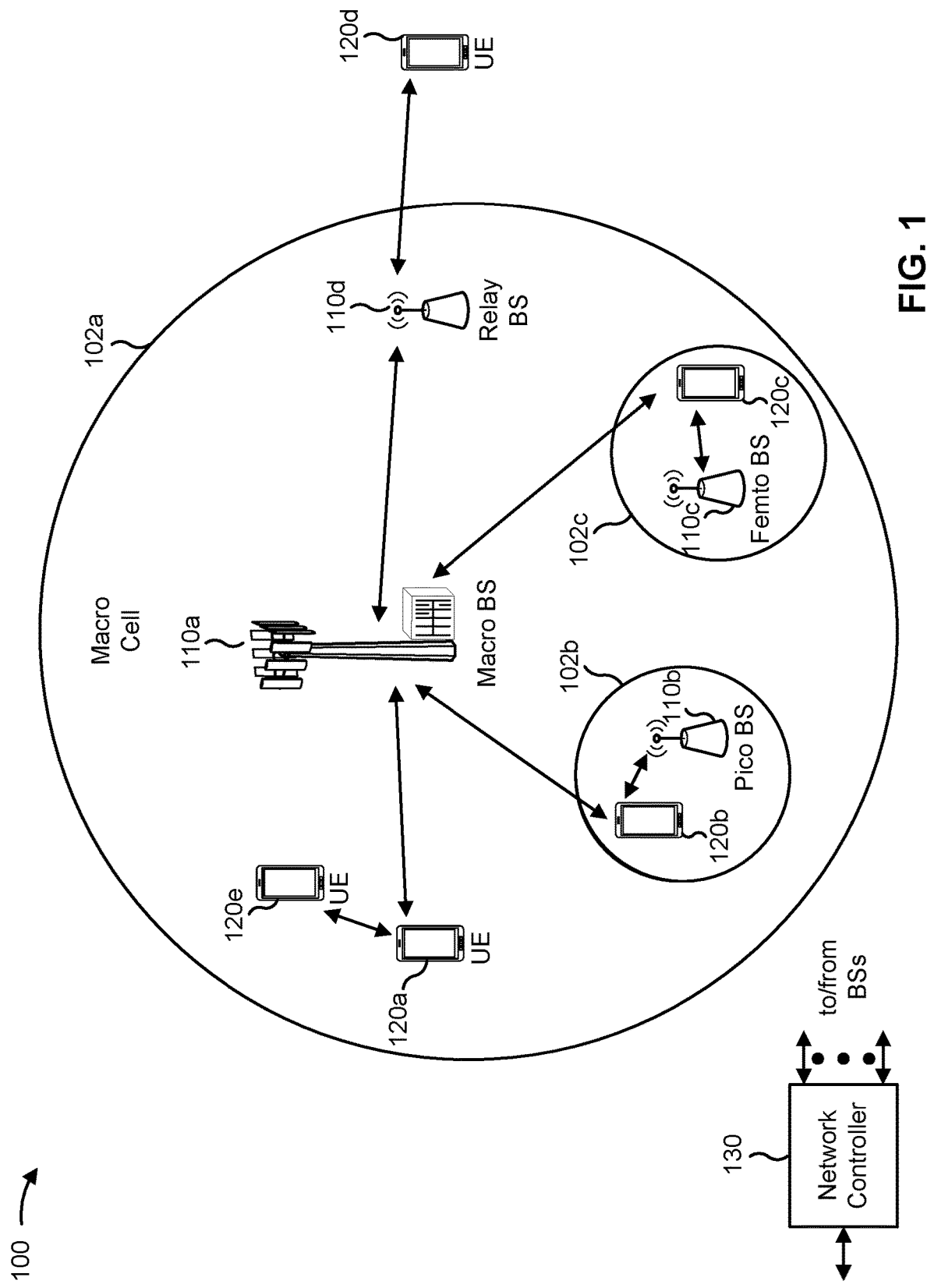
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, an NTN may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations or IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target wireless node (e.g., a UE and/or a base station). In this way, inter-link interference may be reduced.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
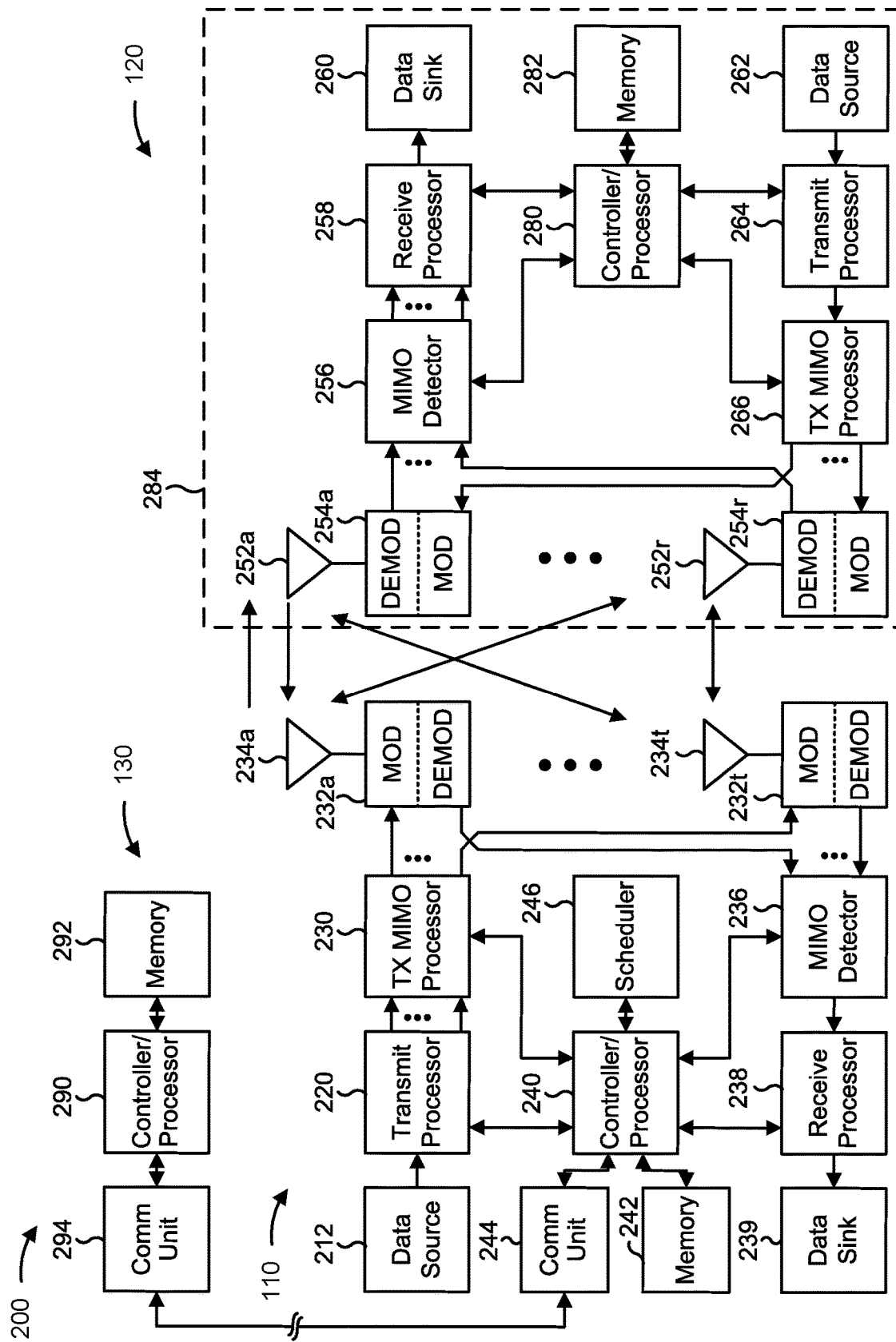
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7 and 8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7 and 8.

Controller/processor 240 of base station 110, controller/processor 280 of UE 120, and/or any other component(s) of FIG. 2 may perform one or more techniques associated with configurable announcements in a network, as described in more detail elsewhere herein. In some aspects, the wireless communication device described herein is the base station 110, is included in the base station 110, or includes one or more components of the base station 110 shown in FIG. 2. In some aspects, the wireless communication device described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, the wireless communication device includes means for transmitting a reception announcement that indicates a plurality of future resource reservations; or means for receiving at least one communication from an additional wireless communication device using at least one of the plurality of future resource reservations. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless communication device includes means for transmitting, during a first time period and using a first transmission frequency, a first set of announcements associated with the plurality of future resource reservations, wherein a first resource reservation of the plurality of resource reservations corresponds to a scheduled time, and wherein the first set of announcements includes the reception announcement; or means for transmitting, during a second time period and using a second transmission frequency that is different than the first transmission frequency, a second set of announcements associated with the plurality of future resource reservations, wherein the second transmission frequency is based at least in part on an amount of time between the second time period and the scheduled time.

In some aspects, the wireless communication device includes means for transmitting a cancellation indication corresponding to the reception announcement, wherein the cancellation indication indicates that one or more future resource reservations of the plurality of future resource reservations are cancelled.

In some aspects, the wireless communication device includes means for determining that a size of the one or more resource reservations satisfies a cancellation threshold; or means for transmitting an additional cancellation indication corresponding to the reception announcement based at least in part on determining that the size of the one or more resource reservations satisfies the cancellation threshold.

In some aspects, the wireless communication device includes means for transmitting a preemption indication corresponding to the reception announcement, wherein the preemption indication indicates that one or more future resource reservations of the plurality of future reservations are preempted.

In some aspects, the wireless communication device includes means for transmitting, during a first time period and using a first transmission frequency, a first set of announcements associated with at least one future communication, wherein the at least one future communication corresponds to at least one scheduled time; or means for transmitting, during a second time period and using a second transmission frequency that is different than the first transmission frequency, a second set of announcements associated with the at least one future communication, wherein the second transmission frequency is based at least in part on an amount of time between the second time period and the at least one scheduled time. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first wireless communication device includes means for transmitting an announcement associated with a future communication and that indicates a reservation of a set of resources associated with the future communication; or means for transmitting a cancellation indication corresponding to the announcement, wherein the cancellation indication indicates that the future communication will not occur. In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first wireless communication device includes means for determining that a size of the reservation satisfies a cancellation threshold; or means for transmitting an additional cancellation indication corresponding to the announcement based at least in part on determining that the size of the reservation satisfies the cancellation threshold.

In some aspects, the first wireless communication device includes means for transmitting an announcement that indicates a reservation of a set of resources associated with a future communication between the first wireless communication device and a second wireless communication device; or means for transmitting a preemption indication corresponding to the announcement, wherein the preemption indication indicates that the future communication will not occur. In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
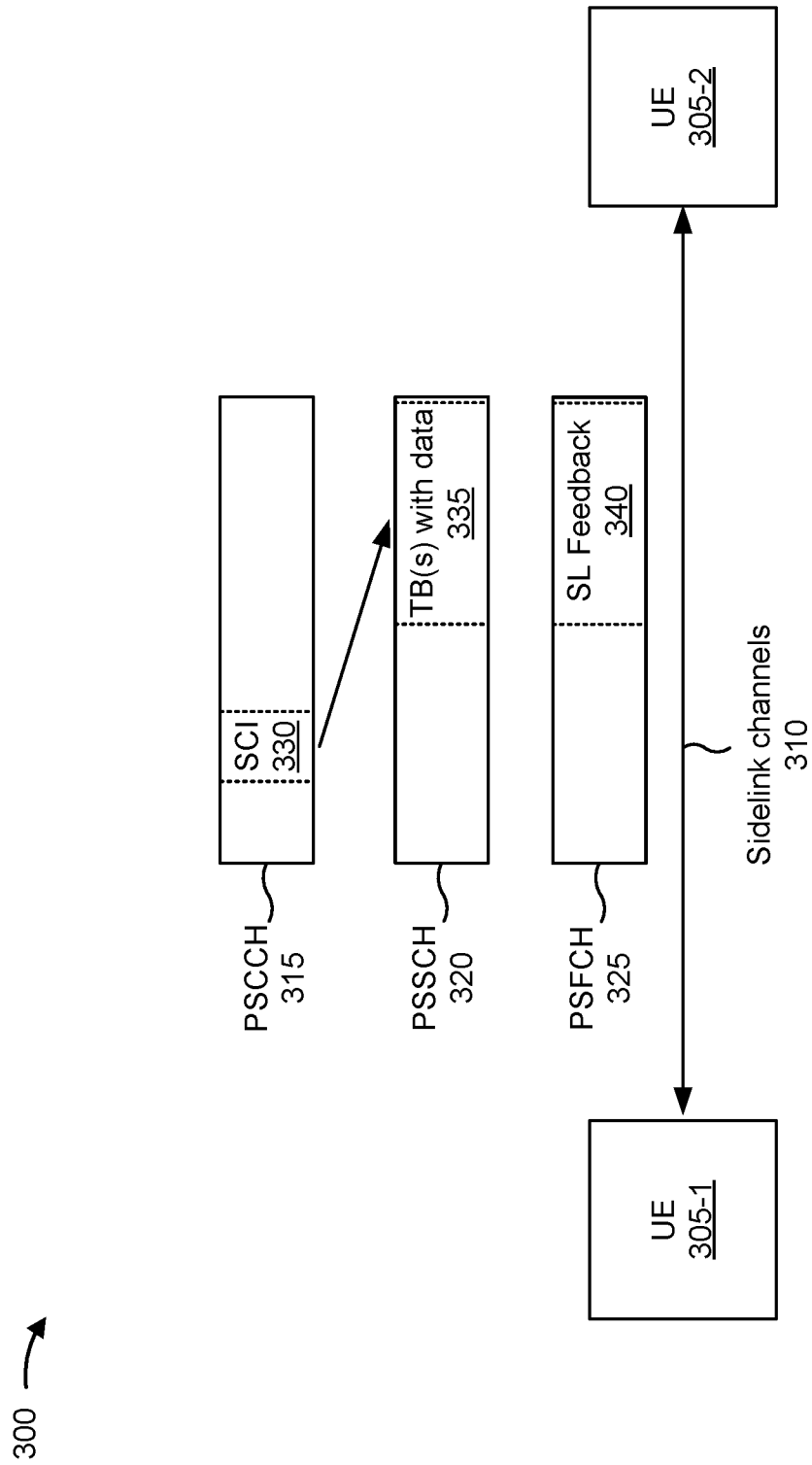
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
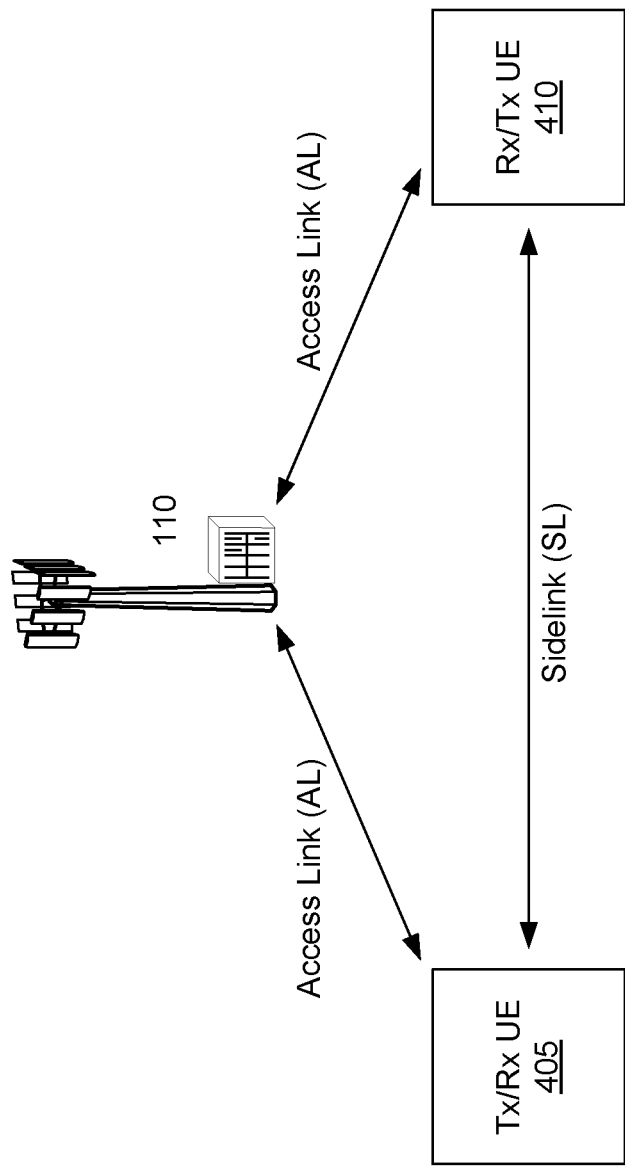
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
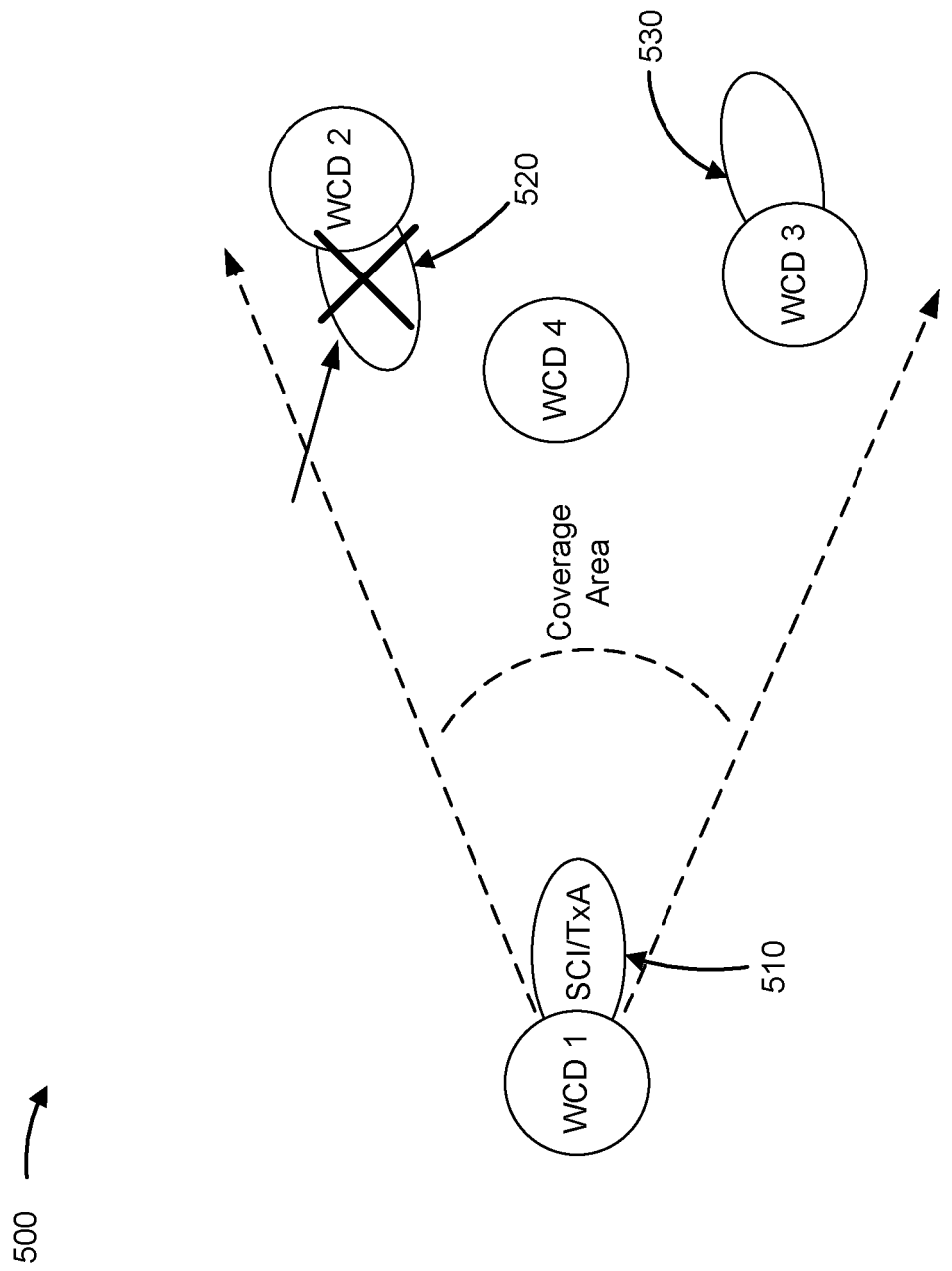
FIGS. 5 and 6 are diagrams illustrating examples of communications in a network, in accordance with various aspects of the present disclosure.

FIG. 5 is a diagram illustrating an example 500 of communications in a network, in accordance with various aspects of the present disclosure. As shown, a first wireless communication device (WCD 1), a second wireless communication device (WCD 2), a third wireless communication device (WCD 3), and a fourth wireless communication device (WCD 4) may communicate in a network. The network may be any type of network in which devices may communicate with other devices using beamforming techniques. For example, the network may be a millimeter wave network. In some cases, the network may be a sidelink network and/or an IAB network, among other examples. In some aspects, one or more of the WCDs may be, include, or be included in a UE, a base station, and/or an IAB node.

The WCD 1 may be scheduled to transmit a first future communication to WCD 4 using a beam 510. The beam 510 may include an expanding coverage area (e.g., beam width) indicated by the area inside the two dashed arrows in FIG. 5. A future communication is a communication that is to occur at some time in the future. Other WCDs may be scheduled to transmit and/or receive future communications using beams within the coverage area of the beam 510.

For example, as indicated in FIG. 5, the WCD 2 may intend to receive a second future communication. The WCD 2 and/or the device that is transmitting that second future communication to the WCD 2 may be configured to select resources to mitigate and/or minimize interference between the first and second future communications. To facilitate avoidance of interference, WCDs may transmit announcements that indicate future communications. In some aspects, announcements may include transmission (Tx) announcements (shown in FIG. 5 as "TxA") that indicate a future transmission of a communication and/or reception (Rx) announcements (shown in FIG. 6 as "RxA") that indicate a future reception of a communication. TxAs and RxAs may indicate the resources that will be used for the future communication.

For example, a transmission announcement may indicate a set of resources reserved for a future transmission of a communication. In some cases, a transmission announcement may be transmitted using a beam to be used to transmit the transmission that is indicated by the transmission announcement. In some cases, the transmission announcement may be transmitted using a beam that is wider than the beam to be used to transmit the transmission indicated by the transmission announcement. In this case, the transmission announcement may be used to facilitate preventing a WCD within the coverage area from using resources, in a direction overlapped by the coverage area, that overlap resources used by the WCD 1 to transmit the future communication. In some cases, the transmission announcement may be transmitted as part of SCI. A nearby WCD can receive the transmission announcement and, in response to receiving the transmission announcement, can select resources and/or beams that do not overlap those indicated in the announcement.

For example, as shown in FIG. 5, the WCD 2 may intend, at least initially, to transmit and/or receive a communication using the beam 520, which may have a coverage area that overlaps the coverage area of the beam 510. The WCD 2 may receive the transmission announcement and, in response to receiving the transmission announcement, may avoid communicating on the beam 520 (as indicated by the "X" over the beam 520). In some cases, the WCD 2 may avoid communicating using resources indicated in the transmission announcement.

In some cases, the WCD 2 may provide a resource recommendation to another WCD (e.g., WCD 3) that is based at least in part on the transmission announcement. For example, as shown in FIG. 5, the WCD 3 may be receiving using a beam 530 that is directed away from the beam 510 on which the transmission announcement is transmitted. As such, the WCD 3 may not receive the transmission announcement. However, the WCD 2 may transmit a resource recommendation to the WCD 3 that indicates the resource information provided in the transmission announcement and/or that suggests resources for the WCD 3 to use that avoid interference with the future communication.

In some cases, to facilitate reception of relevant transmission announcements, a WCD (e.g., WCD 2) may monitor for transmission announcements using a beam that the WCD intends to use to transmit or receive a communication. In some cases, to further facilitate avoidance of interference, a WCD that intends to receive a communication may monitor for transmission announcements. Similarly, a WCD that intends to transmit a communication may monitor for reception announcements.

As indicated above, FIG. 5 is provided as an example. Other examples may differ from what is described with respect to FIG. 5.

Figure 6:
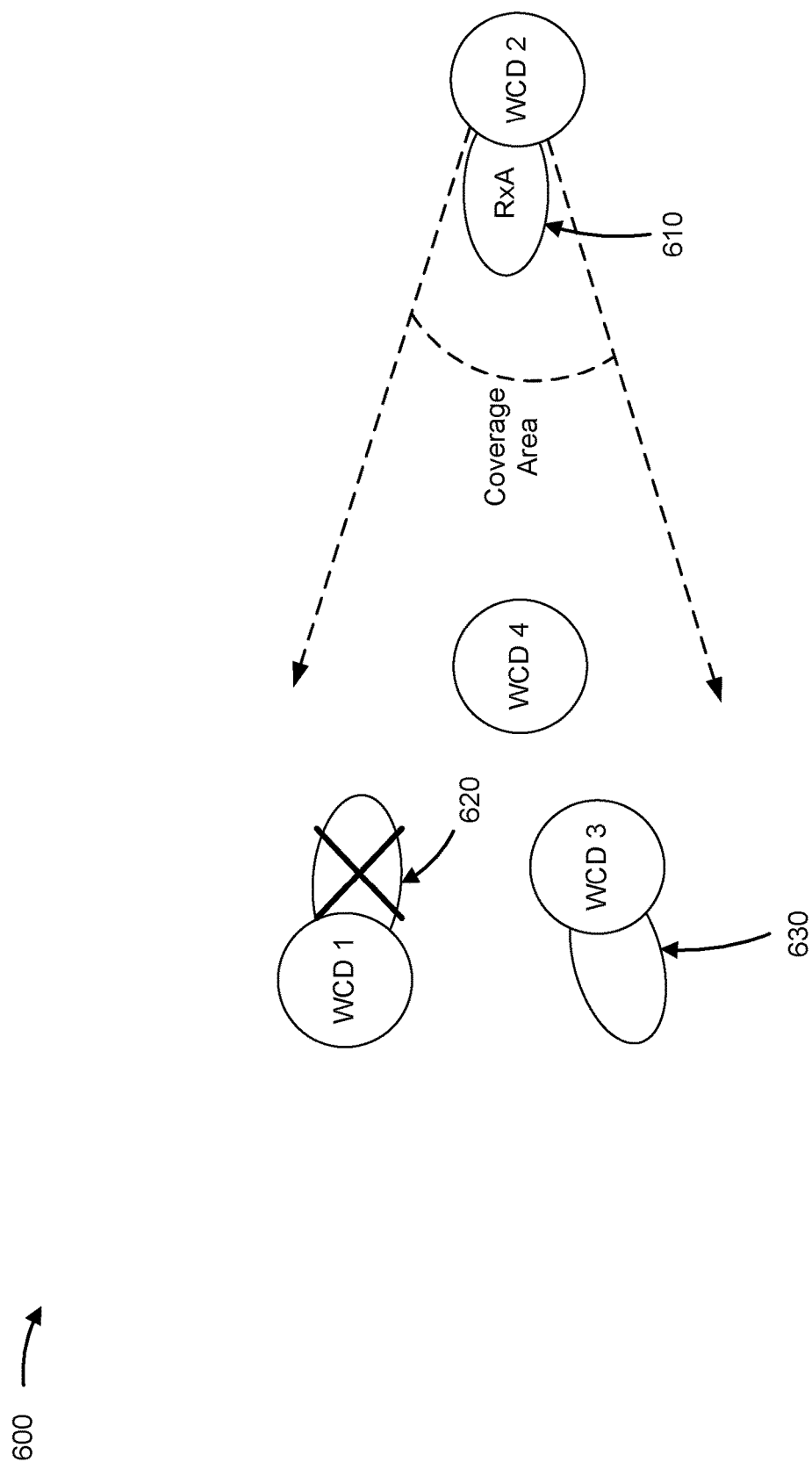

FIG. 6 is a diagram illustrating an example 600 of communications in a network, in accordance with various aspects of the present disclosure. As shown, a first wireless communication device (WCD 1), a second wireless communication device (WCD 2), a third wireless communication device (WCD 3), and a fourth wireless communication device (WCD 4) may communicate in a network. The network may be any type of network in which devices may communicate with other devices using beamforming techniques. For example, the network may be a millimeter wave network. In some cases, the network may be a sidelink network and/or an IAB network, among other examples. In some aspects, one or more of the WCDs may be, include, or be included in a UE, a base station, and/or an IAB node. In some cases, the WCDs may be the WCDs depicted in FIG. 5.

The WCD 2 may be scheduled to receive a first future communication from WCD 4 using a beam 610. The beam 610 may include an expanding coverage area (e.g., beam width) indicated by the area inside the two dashed arrows in FIG. 6. Other WCDs may be scheduled to transmit and/or receive future communications using beams within the coverage area of the beam 610.

For example, as indicated in FIG. 6, the WCD 1 may intend to transmit a second future communication. The WCD 1 and/or the device that is receiving that second future communication from the WCD 1 may be configured to select resources to mitigate and/or minimize interference between the first and second future communications. To facilitate avoidance of interference, WCDs may transmit announcements that indicate future communications. In some aspects, for example, a reception announcement (shown as "RxA") may indicate a set of resources reserved for a future reception of a communication. In some cases, a reception announcement may be received using a beam to be used to receive the communication that is indicated by the reception announcement. In some cases, the reception announcement may be transmitted using a beam that is wider than the beam to be used to receive the communication indicated by the reception announcement. In this case, the reception announcement may be used to facilitate preventing a WCD within the coverage area from using resources, in a direction overlapped by the coverage area, that overlap resources used by the WCD 2 to receive the future communication. In some cases, the reception announcement may be transmitted as part of a PSFCH or similar channel. A nearby WCD can receive the reception announcement and, in response to receiving the reception announcement, can select resources and/or beams that do not overlap those indicated in the announcement.

For example, as shown in FIG. 6, the WCD 1 may intend, at least initially, to transmit and/or receive a communication using the beam 620, which may have a coverage area that overlaps the coverage area of the beam 610. The WCD 1 may receive the reception announcement and, in response to receiving the reception announcement, may avoid communicating on the beam 620 (as indicated by the "X" over the beam 620). In some cases, the WCD 1 may avoid communicating using resources indicated in the reception announcement.

In some cases, the WCD 1 may provide a resource recommendation to another WCD (e.g., WCD 3) that is based at least in part on the reception announcement. For example, as shown in FIG. 6, the WCD 3 may be receiving using a beam 630 that is directed away from the beam 610 on which the reception announcement is transmitted. As such, the WCD 3 may not receive the reception announcement. However, the WCD 1 may transmit a resource recommendation to the WCD 3 that indicates the resource information provided in the reception announcement and/or that suggests resources for the WCD 3 to use that avoid interference with the future communication. In some cases, to facilitate reception of relevant reception announcements, a WCD (e.g., WCD 1) may monitor for reception announcements using a beam that the WCD intends to use to transmit or receive a communication.

In some cases, a transmission announcement and/or reception announcement may not be received by WCDs that should receive them (e.g., WCDs that are scheduled to transmit and/or receive future communications that may interfere with a future communication transmitted and/or received by a WCD). Failure to receive such announcements or receiving announcements that are no longer valid (e.g., due to preemption and/or cancellation of the corresponding communications) may lead to increased instances of interference between communications on a network or avoidance of network resources that are not otherwise being used, thereby reducing network throughput and efficiency, and otherwise decreasing network performance.

Aspects of the techniques and apparatuses described herein may provide configurable announcements in a network. For example, some aspects may include persistent announcements that may be transmitted with some periodicity. In some aspects, a transmission announcement may be configured to indicate a plurality of future resource reservations and/or communications corresponding thereto. For example, the transmission announcement may be configured to indicate four or more future reservations. In some aspects, a reception reservation may be configured to indicate a plurality of future reservations, thereby facilitating more efficient use of network resources.

In some aspects, an announcement may be transmitted multiple times. For example, in some aspects, a first set of announcements (which may be repetitions of the same announcement) may be transmitted according to a first transmission frequency (rate at which the announcements are transmitted—e.g., an inverse of the time period between each transmission). A second set of announcements may be transmitted according to a second transmission frequency. In some aspects, the second transmission frequency may be higher than the first frequency so that announcements are transmitted more frequently as the time for the future communication gets closer. In this way, the number of announcement transmissions may be limited when the time for the future communication is farther away, thereby facilitating more efficient use of network resources.

In some aspects, an announcement may indicate a future communication that is cancelled or preempted before the time for the future communication occurs. In some aspects, a wireless communication device may transmit an announcement that indicates the communication and, at a later time, may transmit a cancellation indication (that indicates a cancellation of the communication) and/or a preemption indication (that indicates a preemption of the resources reserved for the communication). In this way, some aspects may facilitate notifying nearby wireless communication devices of a change in a planned future communication. As a result, some aspects may facilitate increased efficiency of network resource use, throughput, and/or overall network performance.

As indicated above, FIG. 6 is provided as an example. Other examples may differ from what is described with respect to FIG. 6.

Figure 7:
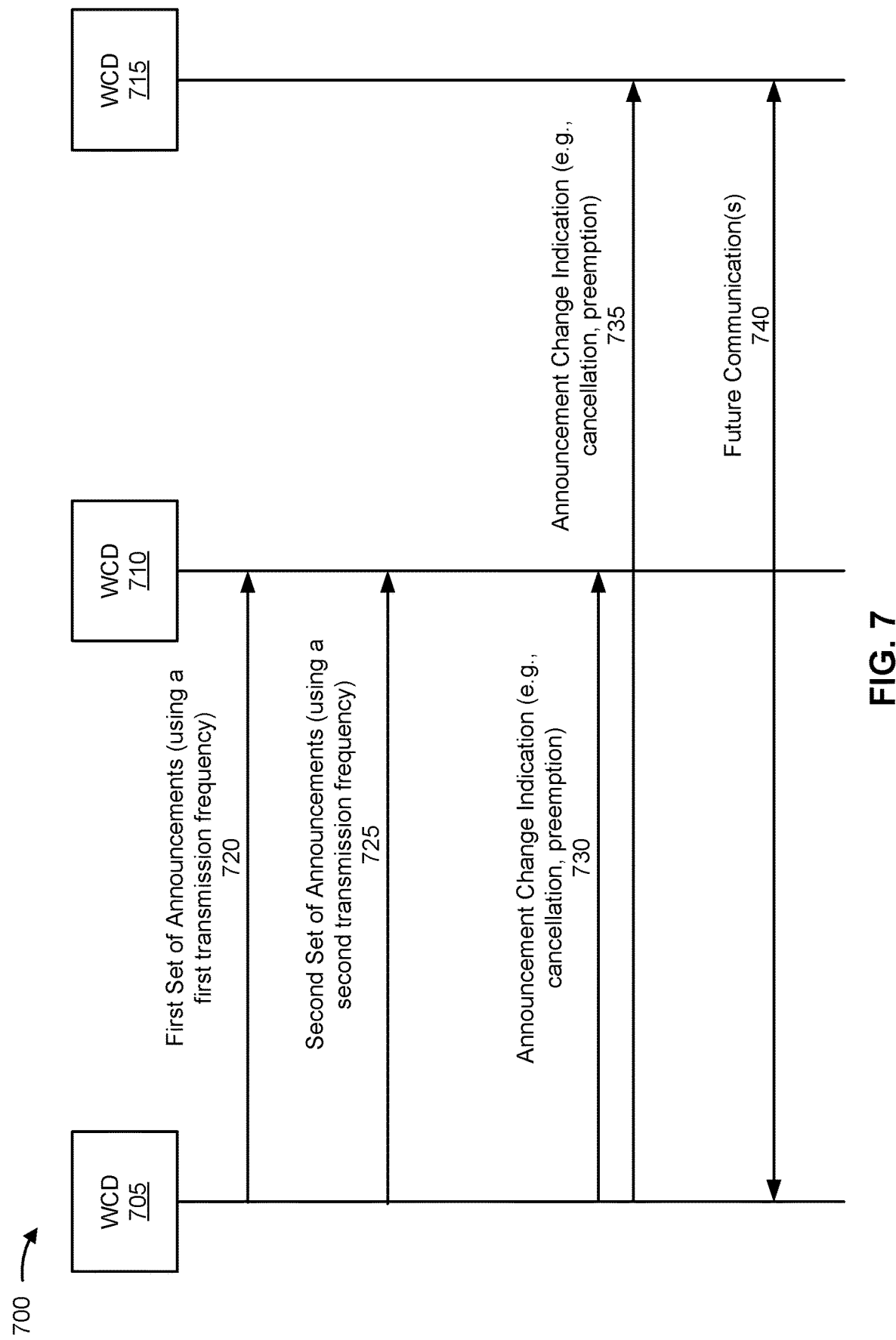
FIGS. 7 and 8 are diagrams illustrating examples associated with configurable announcements in a network, in accordance with various aspects of the present disclosure.

FIG. 7 is a diagram illustrating an example 700 associated with persistent announcements in a network, in accordance with various aspects of the present disclosure. As shown, a first WCD 705, a second WCD 710, and a third WCD 715 may communicate in a network. The network may be any type of network in which devices may communicate with other devices using beamforming techniques. For example, the network may be a millimeter wave network. In some cases, the network may be a sidelink network and/or an IAB network, among other examples. In some aspects, one or more of the WCDs 705, 710, and 715 may be, include, or be included in a UE, a base station, and/or an IAB node.

As shown by reference number 720, the WCD 705 may transmit, and the WCD 710 may receive, a first set of announcements. The first set of announcements may include one or more transmission announcements or reception announcements. For example, in some aspects, the first set of announcements may include a transmission or reception announcement. In some aspects, the announcement may indicate one or more future reservations. In some aspects, for example, an announcement may indicate one, two, three, four, or more future resource reservations corresponding to a future communication or communications. The announcement or announcements may include transmission announcements and/or reception announcements.

In some aspects, the WCD 705 may transmit the first set of announcements during a first time period and using a first transmission frequency. The first transmission frequency may be a frequency of transmission associated with a periodicity. A periodicity refers to the amount of time between transmissions. A short periodicity refers to a small amount of time between transmissions and, as such, may correspond to more transmissions occurring within a certain amount of time than the number of transmissions during that same amount of time corresponding to a long periodicity. In some aspects, the first set of announcements may be transmitted with a long periodicity. The first set of announcements may be associated with a plurality of future resource reservations, where a first resource reservation of the plurality of resource reservations corresponds to a scheduled time.

As shown by reference number 725, the WCD 705 may transmit, and the WCD 710 may receive, a second set of announcements associated with the plurality of future resource reservations. The second set of announcements may be transmitted during a second time period and/or using a second transmission frequency that is different than the first transmission frequency. In some aspects, for example, the second transmission frequency may be greater than the first transmission frequency. As a result, the periodicity associated with the second set of announcements may be shorter than the periodicity associated with the first set of announcements.

In some aspects, the transmission frequency may be based at least in part on a distance of a transmission of an announcement from the first future communication in time. In this way, announcements may be transmitted with greater frequency as the time for the future communication approaches, increasing chances that devices will receive the announcements. As a result, aspects of this dynamically changing transmission frequency also may facilitate reducing communication resource consumption for notifying of communications that are not imminent.

As shown by reference number 730, the WCD 705 may transmit, and the WCD 710 may receive, an announcement change indication. The announcement change indication may include a cancellation indication and/or a preemption indication, among other examples. In some aspects, the announcement change indication may be transmitted to WCD 715 (with which the future communication is scheduled) to alert the WCD 715 of the change.

A cancellation indication may indicate that one or more future resource reservations are cancelled. In some aspects, the cancellation indication may include an identifier associated with the one or more future resource reservations. In this way, the WCD 710 may be able to identify the future reservation that has been canceled and may schedule another future communication using the resources that are available as a result of the cancellation. The cancellation indication may include the announcement corresponding to the canceled reservation to facilitate identifying the resources that have become available (e.g., so that, even if the WCD 710 did not store an indication of the future reservation, the WCD 710 may ascertain available resources). In some aspects, the identifier may include a UE identifier corresponding to the wireless communication device 705.

In some aspects, the WCD 705 may transmit the cancellation announcement using a beam that is wider than the beam associated with the transmission of the corresponding announcement. For example, the WCD 705 may transmit the announcement using a beam having a first beam width and may transmit the cancellation indication using a beam having a second beam width, where the second beam width is larger than the first beam width. In this way, aspects may facilitate increasing the chance that more devices receive the cancellation indication. As a result, aspects may facilitate preventing unnecessary avoidance of otherwise-available resources and/or account for movement of devices and the monitoring of other beams by devices.

In some aspects, the WCD 705 may repeat cancellation indication transmissions to further facilitate avoidance of resource waste. Repetition of cancellation indications may be dependent upon reservation size. For example, the WCD 705 may determine that a size of the one or more resource reservations satisfies a cancellation threshold and transmit an additional cancellation indication (or a plurality of additional cancellation indications) corresponding to the reception announcement based at least in part on determining that the size of the one or more resource reservations satisfies the cancellation threshold. In this way, avoidance of waste of large resource reservations may be enhanced.

In some aspects, as indicated above, the change indication may include a preemption indication. A preemption indication may indicate that one or more future resource reservations of the plurality of future reservations are preempted. In some aspects, as shown by reference number 735, the preemption indication may be transmitted to the WCD 715 to indicate to WCD 715 that future communication between the WCD 705 and the WCD 715 is no longer to occur using the reserved resources, as those resources have been preempted for a communication with another WCD. Since the resources are still reserved, there may be no value in transmitting the preemption indication to other devices. From the perspective of other devices, the reserved resources are still unavailable and/or subject to interference.

In some aspects, however, the preemption indication may be transmitted to other WCDs (e.g., WCD 710). For example, in some aspects, the preempting communication may be scheduled to use a different beam than the beam associated with the future communication. In this case, the possibility of interference from using the same or overlapping resources on a different beam may be reduced, in which case the WCD 710 may determine that the resources are available for a communication. In some aspects, the preemption indication may indicate a reason for preemption of the one or more future resource reservations. For example, the preemption indication may indicate that a set of resources associated with the one or more future resource reservations will be used by another wireless communication device.

As shown by reference number 740, the WCD 705 may engage in future communications with the WCD 715. In some aspects, the WCD 705 may transmit a future communication to the WCD 715. In some aspects, the WCD 705 may receive a future communication from at least one communication from an additional wireless communication device using at least one of the plurality of future resource reservations.

As indicated above, FIG. 7 is provided as an example. Other examples may differ from what is described with respect to FIG. 7.

Figure 8:
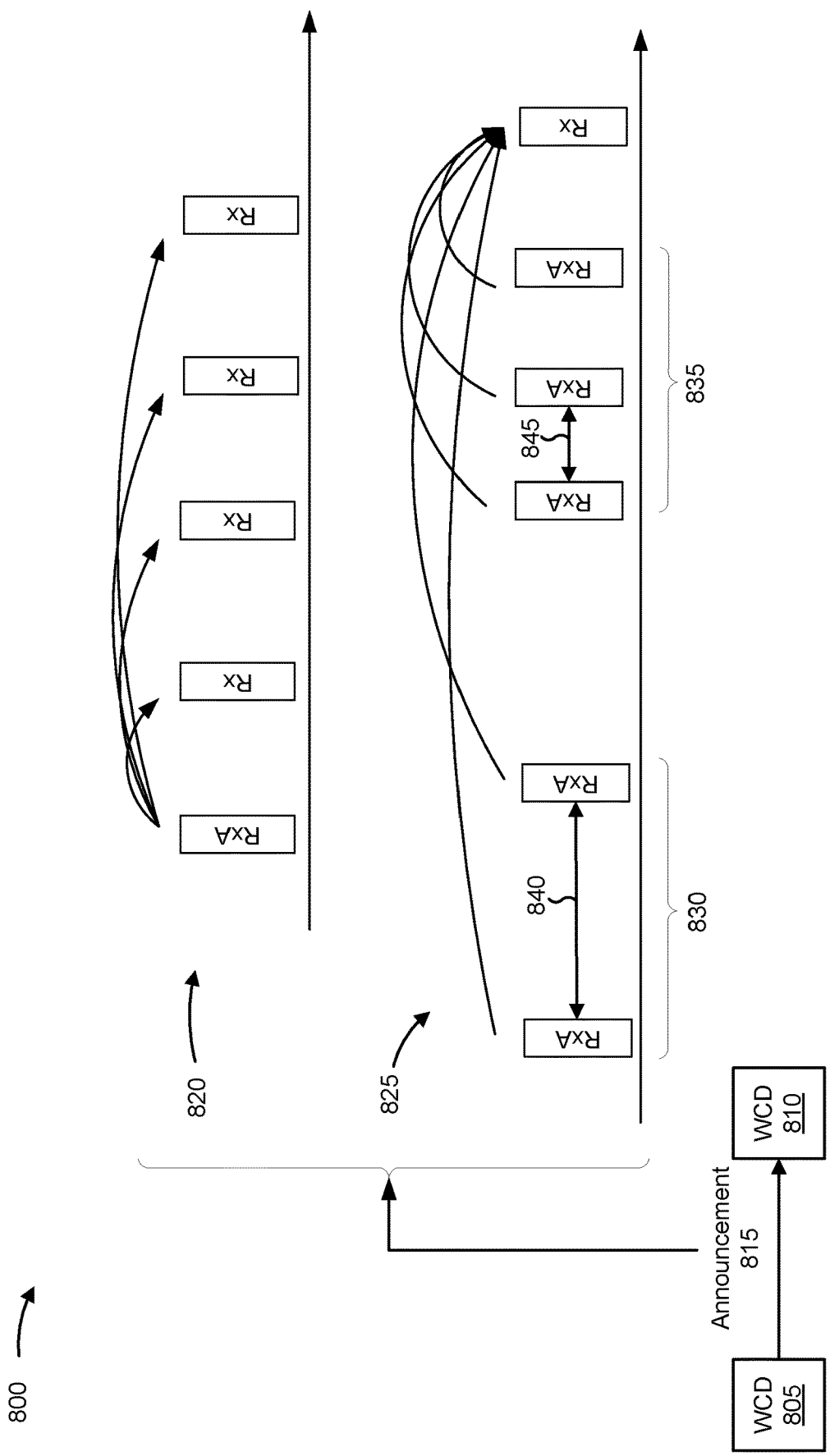

FIG. 8 is a diagram illustrating an example 800 associated with persistent announcements in a network, in accordance with various aspects of the present disclosure. As shown in FIG. 8, a first WCD 805 may communicate with a second WCD 810. In some aspects, the WCD 805 may be, be similar to, be included in, or include, the WCD 705 shown in FIG. 7 and the WCD 810 may be, be similar to, be included in, or include the WCD 710 shown in FIG. 7.

As shown by reference number 815, the WCD 805 may transmit an announcement to the WCD 810. The announcement may include one or more reception announcements (RxAs) may be used to indicate one or more future resource reservations corresponding to one or more future communications (receptions, Rxs, in the illustrated examples). In some aspects, transmission announcements (TxAs) may be used to indicate one or more future resource reservations corresponding to one or more future transmission communications.

As shown by reference number 820, a single reception announcement (RxA) may indicate a plurality of resource reservations for communication receptions (Rxs). In the illustrated example, the reception announcement may indicate four future reception communications. In some aspects, the reception announcement may indicate more than four future reception communications or less than four future reception communications.

As shown by reference number 825, multiple reception announcements may be used to indicate a future resource reservation and a transmission frequency may be based at least on a time between an announcement and a resource reservation. For example, as shown, the WCD 805 may transmit a first set 830 of reception announcements and a second set 835 of reception announcements. The WCD 805 may transmit the first set 830 of reception announcements using a first transmission frequency that may correspond to a first periodicity 840. The WCD 805 may transmit the second set 835 of reception announcements using a second transmission frequency that may correspond to a second periodicity 845 that is shorter than the first periodicity 840.

The WCD 805 may change the transmission frequency from the first frequency to the second frequency based at least in part on a distance (amount of time) between an announcement and the resource reservation and/or a distance between a current time and the resource reservation, among other examples. For example, the WCD 805 may determine a distance between a current time and the time of the resource reservation and compare the determined distance to a distance threshold. The WCD 805 may select a transmission frequency based at least in part on whether the distance satisfies the distance threshold.

As indicated above, FIG. 8 is provided as an example. Other examples may differ from what is described with respect to FIG. 8.

Figure 9:
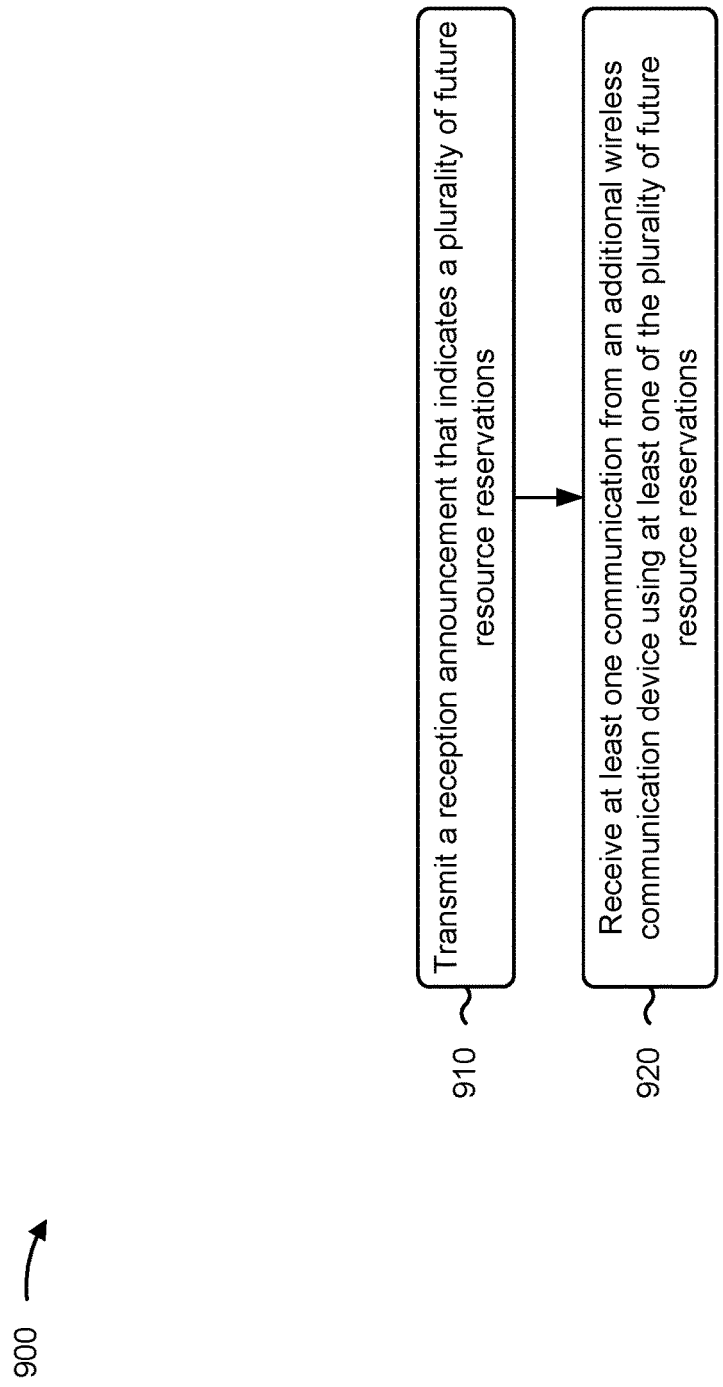
FIGS. 9-12 are diagrams illustrating example processes associated with configurable announcements in a network, in accordance with various aspects of the present disclosure.

FIG. 9 is a diagram illustrating an example process 900 performed, for example, by a wireless communication device, in accordance with various aspects of the present disclosure. Example process 900 is an example where the wireless communication device (e.g., wireless communication device 705 shown in FIG. 7, apparatus 1300 shown in FIG. 13) performs operations associated configurable announcements in a network.

As shown in FIG. 9, in some aspects, process 900 may include transmitting a reception announcement that indicates a plurality of future resource reservations (block 910). For example, the wireless communication device (e.g., using transmission component 1304, depicted in FIG. 13) may transmit a reception announcement that indicates a plurality of future resource reservations, as described above.

As further shown in FIG. 9, in some aspects, process 900 may include receiving at least one communication from an additional wireless communication device using at least one of the plurality of future resource reservations (block 920). For example, the wireless communication device (e.g., using reception component 1302, depicted in FIG. 13) may receive at least one communication from an additional wireless communication device using at least one of the plurality of future resource reservations, as described above.

Process 900 may include additional aspects, such as any single aspect or any combination of aspects described below and/or in connection with one or more other processes described elsewhere herein.

In a first aspect, the plurality of future resource reservations comprises at least four future resource reservations.

In a second aspect, alone or in combination with the first aspect, process 900 includes transmitting, during a first time period and using a first transmission frequency, a first set of announcements associated with the plurality of future resource reservations, wherein a first resource reservation of the plurality of resource reservations corresponds to a scheduled time, and wherein the first set of announcements includes the reception announcement, and transmitting, during a second time period and using a second transmission frequency that is different than the first transmission frequency, a second set of announcements associated with the plurality of future resource reservations, wherein the second transmission frequency is based at least in part on an amount of time between the second time period and the scheduled time.

In a third aspect, alone or in combination with one or more of the first and second aspects, an amount of time between the first time period and the scheduled time is longer than the amount of time between the second time period and the scheduled time, and wherein the second transmission frequency is higher than the first transmission frequency based at least in part on the amount of time between the first time period and the scheduled time being longer than the amount of time between the second time period and the scheduled time.

In a fourth aspect, alone or in combination with one or more of the first through third aspects, process 900 includes transmitting a cancellation indication corresponding to the reception announcement, wherein the cancellation indication indicates that one or more future resource reservations of the plurality of future resource reservations are cancelled.

In a fifth aspect, alone or in combination with one or more of the first through fourth aspects, the cancellation indication comprises an identifier associated with the one or more future resource reservations.

In a sixth aspect, alone or in combination with one or more of the first through fifth aspects, the identifier comprises a user equipment identifier corresponding to the wireless communication device.

In a seventh aspect, alone or in combination with one or more of the first through sixth aspects, transmitting the reception announcement comprises transmitting the reception announcement using a beam having a first beam width, and wherein transmitting the cancellation indication comprises transmitting the cancellation indication using a beam having a second beam width, wherein the second beam width is larger than the first beam width.

In an eighth aspect, alone or in combination with one or more of the first through seventh aspects, process 900 includes determining that a size of the one or more resource reservations satisfies a cancellation threshold, and transmitting an additional cancellation indication corresponding to the reception announcement based at least in part on determining that the size of the one or more resource reservations satisfies the cancellation threshold.

In a ninth aspect, alone or in combination with one or more of the first through eighth aspects, process 900 includes transmitting a preemption indication corresponding to the reception announcement, wherein the preemption indication indicates that one or more future resource reservations of the plurality of future reservations are preempted.

In a tenth aspect, alone or in combination with one or more of the first through ninth aspects, transmitting the preemption indication corresponds transmitting the preemption indication to the additional wireless communication device.

In an eleventh aspect, alone or in combination with one or more of the first through tenth aspects, the preemption indication indicates a reason for preemption of the one or more future resource reservations.

In a twelfth aspect, alone or in combination with one or more of the first through eleventh aspects, the preemption indication indicates that a set of resources associated with the one or more future resource reservations will be used by another wireless communication device.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
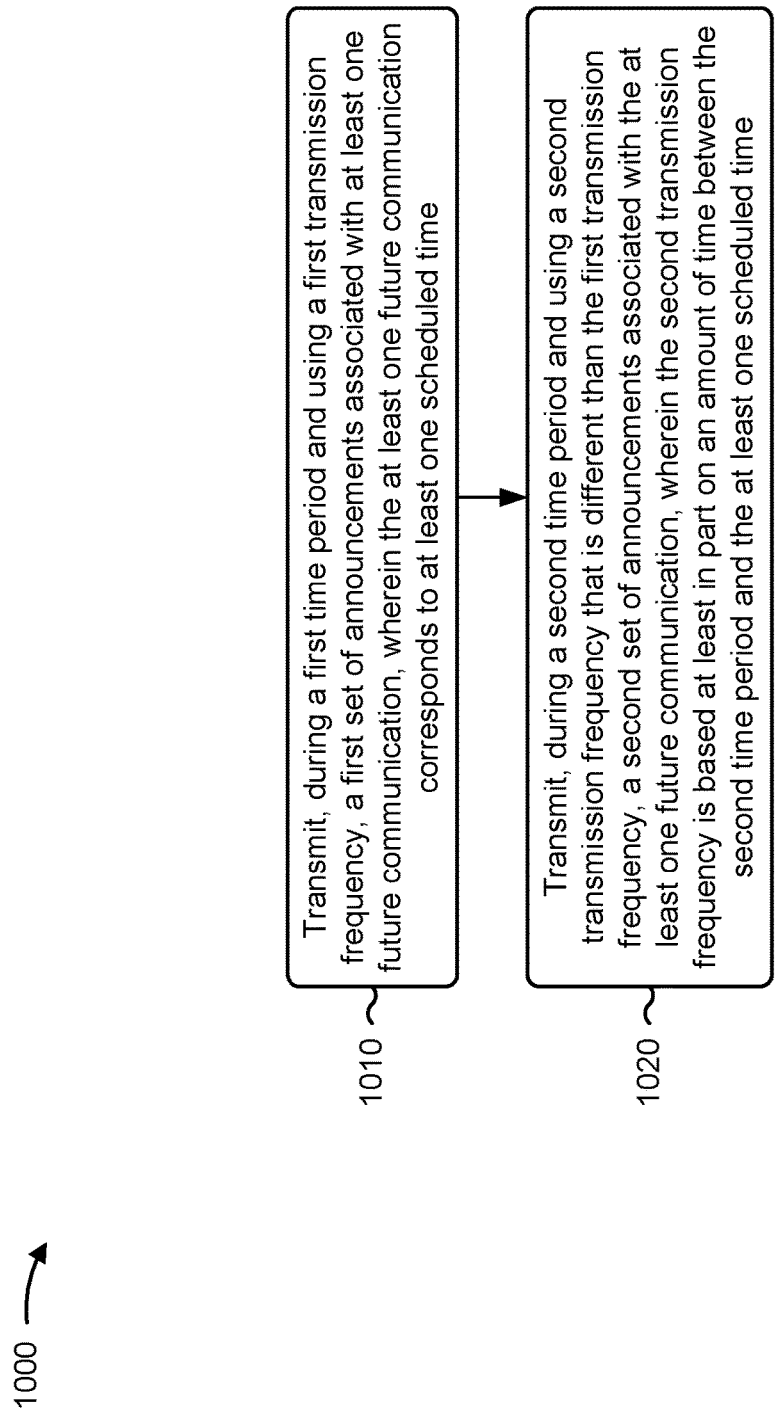

FIG. 10 is a diagram illustrating an example process 1000 performed, for example, by a wireless communication device, in accordance with various aspects of the present disclosure. Example process 1000 is an example where the wireless communication device (e.g., wireless communication device 705 shown in FIG. 7, apparatus 1300 shown in FIG. 13) performs operations associated with configurable announcements in a network.

As shown in FIG. 10, in some aspects, process 1000 may include transmitting, during a first time period and using a first transmission frequency, a first set of announcements associated with at least one future communication, wherein the at least one future communication corresponds to at least one scheduled time (block 1010). For example, the wireless communication device (e.g., using transmission component 1304, depicted in FIG. 13) may transmit, during a first time period and using a first transmission frequency, a first set of announcements associated with at least one future communication, wherein the at least one future communication corresponds to at least one scheduled time, as described above.

As further shown in FIG. 10, in some aspects, process 1000 may include transmitting, during a second time period and using a second transmission frequency that is different than the first transmission frequency, a second set of announcements associated with the at least one future communication, wherein the second transmission frequency is based at least in part on an amount of time between the second time period and the at least one scheduled time (block 1020). For example, the wireless communication device (e.g., using transmission component 1304, depicted in FIG. 13) may transmit, during a second time period and using a second transmission frequency that is different than the first transmission frequency, a second set of announcements associated with the at least one future communication, wherein the second transmission frequency is based at least in part on an amount of time between the second time period and the at least one scheduled time, as described above.

Process 1000 may include additional aspects, such as any single aspect or any combination of aspects described below and/or in connection with one or more other processes described elsewhere herein.

In a first aspect, the at least one future communication comprises a plurality of future communications, and wherein an announcement of the first set of announcements indicates the plurality of future communications.

In a second aspect, alone or in combination with the first aspect, the plurality of future communications comprises at least four future communications.

In a third aspect, alone or in combination with one or more of the first and second aspects, an announcement of the first set of announcements comprises a reception announcement.

In a fourth aspect, alone or in combination with one or more of the first through third aspects, an amount of time between the first time period and the scheduled time is longer than the amount of time between the second time period and the scheduled time, and wherein the second transmission frequency is higher than the first transmission frequency based at least in part on the amount of time between the first time period and the scheduled time being longer than the amount of time between the second time period and the scheduled time.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
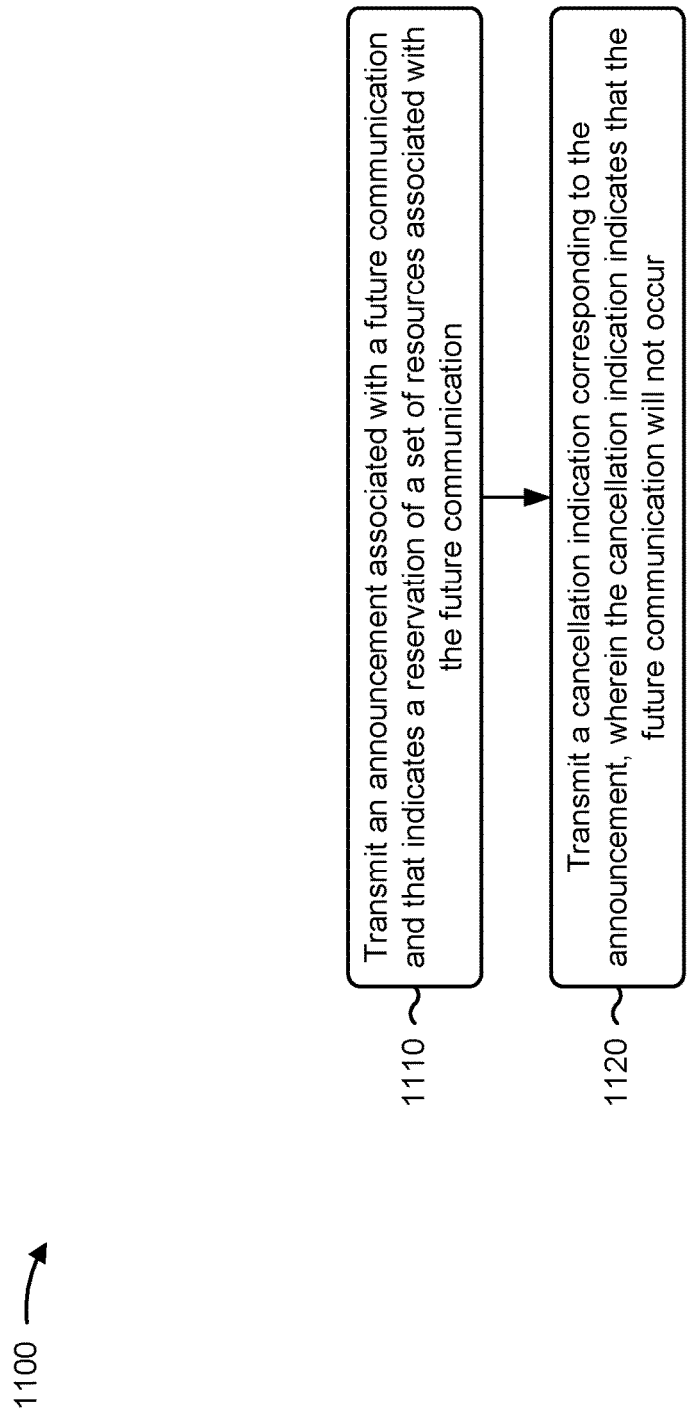

FIG. 11 is a diagram illustrating an example process 1100 performed, for example, by a first wireless communication device, in accordance with various aspects of the present disclosure. Example process 1100 is an example where the first wireless communication device (e.g., wireless communication device 705 shown in FIG. 7, apparatus 1300 shown in FIG. 13) performs operations associated with configurable announcements in a network.

As shown in FIG. 11, in some aspects, process 1100 may include transmitting an announcement associated with a future communication and that indicates a reservation of a set of resources associated with the future communication (block 1110). For example, the first wireless communication device (e.g., using transmission component 1304, depicted in FIG. 13) may transmit an announcement associated with a future communication and that indicates a reservation of a set of resources associated with the future communication, as described above.

As further shown in FIG. 11, in some aspects, process 1100 may include transmitting a cancellation indication corresponding to the announcement, wherein the cancellation indication indicates that the future communication will not occur (block 1120). For example, the first wireless communication device (e.g., using transmission component 1304, depicted in FIG. 13) may transmit a cancellation indication corresponding to the announcement, wherein the cancellation indication indicates that the future communication will not occur, as described above.

Process 1100 may include additional aspects, such as any single aspect or any combination of aspects described below and/or in connection with one or more other processes described elsewhere herein.

In a first aspect, the announcement comprises a reception announcement.

In a second aspect, alone or in combination with the first aspect, the announcement comprises a transmission announcement.

In a third aspect, alone or in combination with one or more of the first and second aspects, the cancellation indication comprises an identifier associated with the reservation.

In a fourth aspect, alone or in combination with one or more of the first through third aspects, the identifier comprises a user equipment identifier corresponding to the wireless communication device.

In a fifth aspect, alone or in combination with one or more of the first through fourth aspects, transmitting the announcement comprises transmitting the announcement using a beam having a first beam width, and wherein transmitting the cancellation indication comprises transmitting the cancellation indication using a beam having a second beam width, wherein the second beam width is larger than the first beam width.

In a sixth aspect, alone or in combination with one or more of the first through fifth aspects, process 1100 includes determining that a size of the reservation satisfies a cancellation threshold, and transmitting an additional cancellation indication corresponding to the announcement based at least in part on determining that the size of the reservation satisfies the cancellation threshold.

In a seventh aspect, alone or in combination with one or more of the first through sixth aspects, the cancellation indication indicates the reservation.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
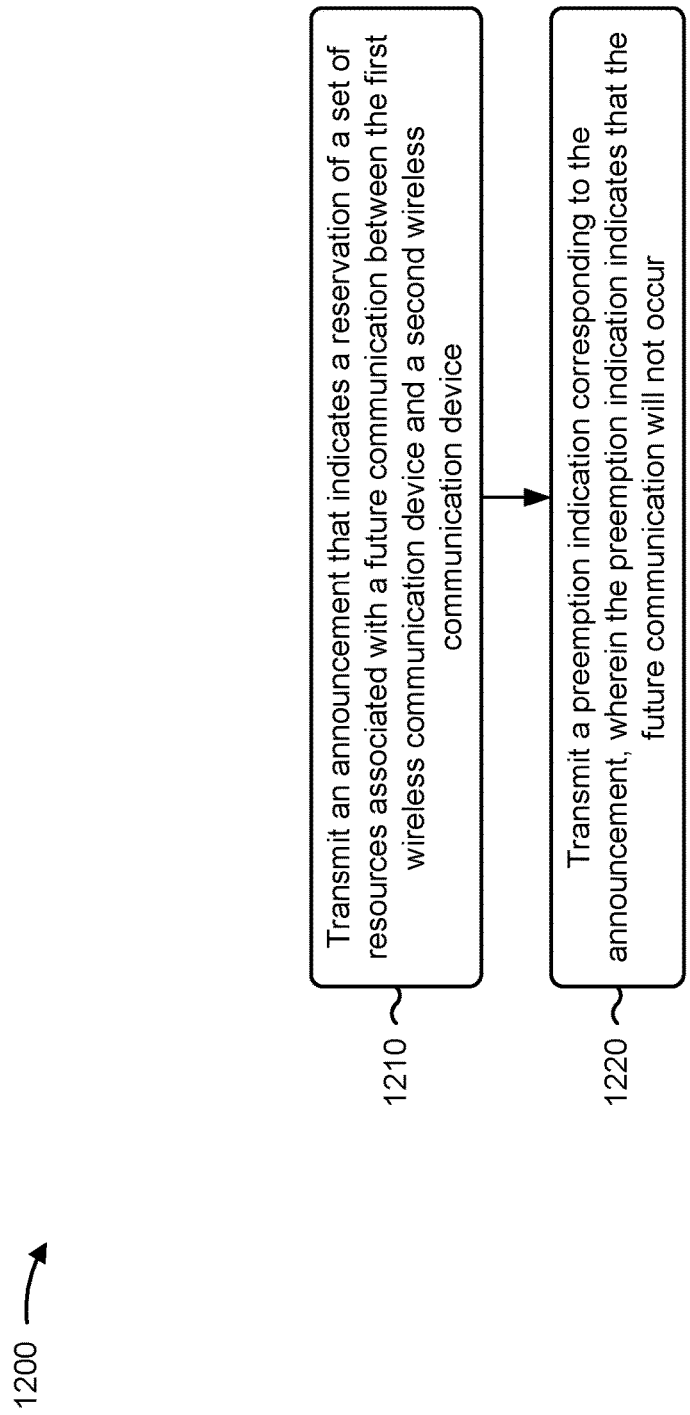

FIG. 12 is a diagram illustrating an example process 1200 performed, for example, by a first wireless communication device, in accordance with various aspects of the present disclosure. Example process 1200 is an example where the first wireless communication device (e.g., wireless communication device 705 shown in FIG. 7, apparatus 1300 shown in FIG. 13) performs operations associated with configurable announcements in a network.

As shown in FIG. 12, in some aspects, process 1200 may include transmitting an announcement that indicates a reservation of a set of resources associated with a future communication between the first wireless communication device and a second wireless communication device (block 1210). For example, the first wireless communication device (e.g., using transmission component 1304, depicted in FIG. 13) may transmit an announcement that indicates a reservation of a set of resources associated with a future communication between the first wireless communication device and a second wireless communication device, as described above.

As further shown in FIG. 12, in some aspects, process 1200 may include transmitting a preemption indication corresponding to the announcement, wherein the preemption indication indicates that the future communication will not occur (block 1220). For example, the first wireless communication device (e.g., using transmission component 1304, depicted in FIG. 13) may transmit a preemption indication corresponding to the announcement, wherein the preemption indication indicates that the future communication will not occur, as described above.

Process 1200 may include additional aspects, such as any single aspect or any combination of aspects described below and/or in connection with one or more other processes described elsewhere herein.

In a first aspect, transmitting the preemption indication corresponds transmitting the preemption indication to the second wireless communication device.

In a second aspect, alone or in combination with the first aspect, the preemption indication indicates a reason for preemption of the future communication.

In a third aspect, alone or in combination with one or more of the first and second aspects, the preemption indication indicates that the set of resources will be used to communicate with a third wireless communication device.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
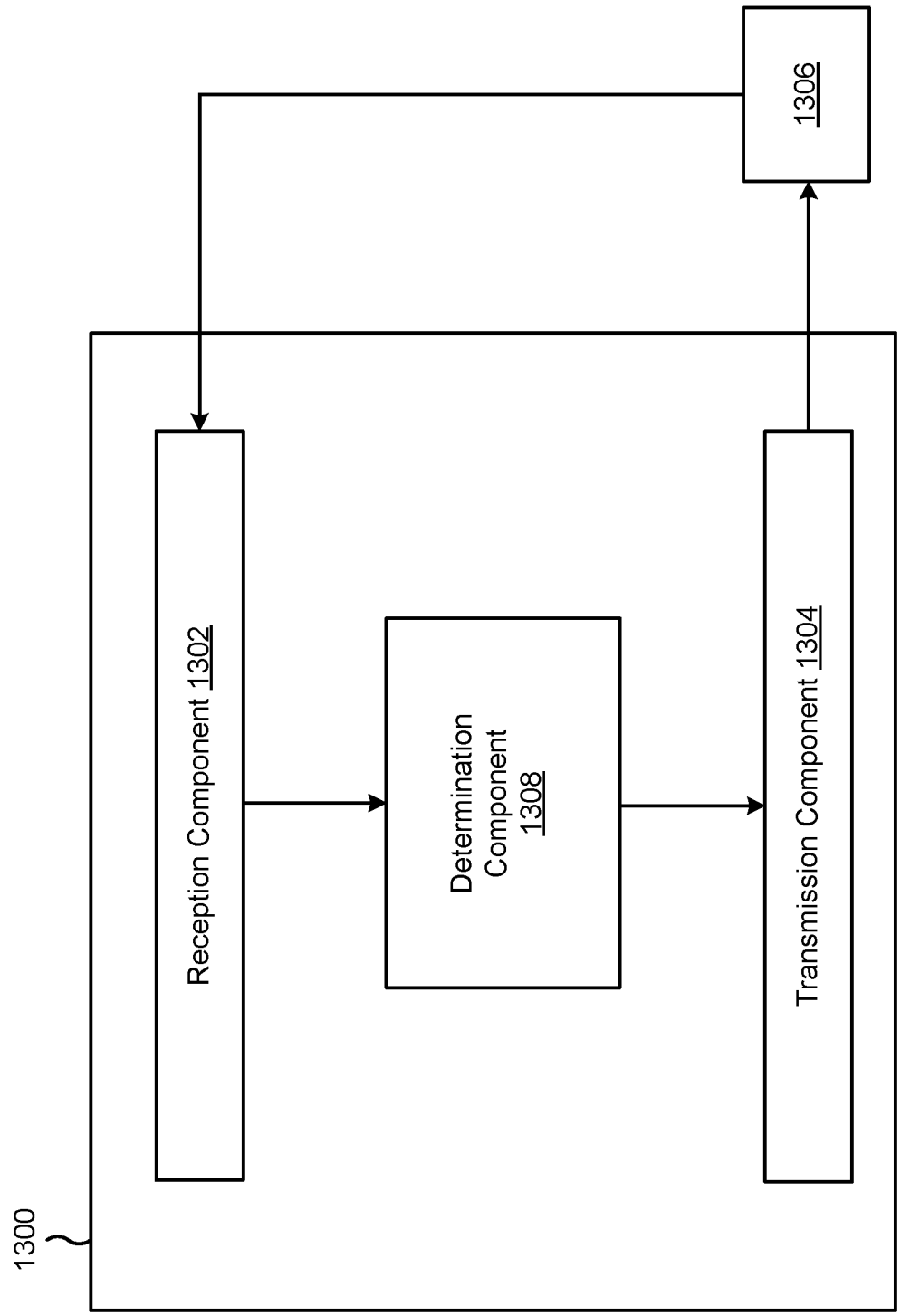
FIG. 13 is a block diagram of an example apparatus for wireless communication, in accordance with various aspects of the present disclosure.

FIG. 13 is a block diagram of an example apparatus 1300 for wireless communication. The apparatus 1300 may be a wireless communication device, or a wireless communication device may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a determination component 1308.

In some aspects, the apparatus 1300 may be configured to perform one or more operations described herein in connection with FIGS. 7 and 8. Additionally, or alternatively, the apparatus 1300 may be configured to perform one or more processes described herein, such as process 900 of FIG. 9, process 1000 of FIG. 10, process 1100 of FIG. 11, process 1200 of FIG. 12, or a combination thereof. In some aspects, the apparatus 1300 and/or one or more components shown in FIG. 13 may include one or more components of the wireless communication device described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the wireless communication device described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the wireless communication device described above in connection with FIG. 2. In some aspects, the transmission component 1304 may be co-located with the reception component 1302 in a transceiver.

The transmission component 1304 may transmit a reception announcement that indicates a plurality of future resource reservations. The reception component 1302 may receive at least one communication from an additional wireless communication device using at least one of the plurality of future resource reservations.

The transmission component 1304 may transmit, during a first time period and using a first transmission frequency, a first set of announcements associated with the plurality of future resource reservations, wherein a first resource reservation of the plurality of resource reservations corresponds to a scheduled time, and wherein the first set of announcements includes the reception announcement. The transmission component 1304 may transmit, during a second time period and using a second transmission frequency that is different than the first transmission frequency, a second set of announcements associated with the plurality of future resource reservations, wherein the second transmission frequency is based at least in part on an amount of time between the second time period and the scheduled time.

The transmission component 1304 may transmit a cancellation indication corresponding to the reception announcement, wherein the cancellation indication indicates that one or more future resource reservations of the plurality of future resource reservations are cancelled. The determination component 1380 may determine that a size of the one or more resource reservations satisfies a cancellation threshold. In some aspects, the determination component 1380 may include a controller/processor, a memory, or a combination thereof, of the wireless communication device described above in connection with FIG. 2. The transmission component 1304 may transmit an additional cancellation indication corresponding to the reception announcement based at least in part on determining that the size of the one or more resource reservations satisfies the cancellation threshold.

The transmission component 1304 may transmit a preemption indication corresponding to the reception announcement, wherein the preemption indication indicates that one or more future resource reservations of the plurality of future reservations are preempted.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of aspects of the present disclosure:

Aspect 1: A method of wireless communication performed by a wireless communication device, comprising: transmitting a reception announcement that indicates a plurality of future resource reservations; and receiving at least one communication from an additional wireless communication device using at least one of the plurality of future resource reservations.

Aspect 2: The method of aspect 1, wherein the plurality of future resource reservations comprises at least four future resource reservations.

Aspect 3: The method of either of aspects 1 or 2, further comprising: transmitting, during a first time period and using a first transmission frequency, a first set of announcements associated with the plurality of future resource reservations, wherein a first resource reservation of the plurality of resource reservations corresponds to a scheduled time, and wherein the first set of announcements includes the reception announcement; and transmitting, during a second time period and using a second transmission frequency that is different than the first transmission frequency, a second set of announcements associated with the plurality of future resource reservations, wherein the second transmission frequency is based at least in part on an amount of time between the second time period and the scheduled time.

Aspect 4: The method of aspect 3, wherein an amount of time between the first time period and the scheduled time is longer than the amount of time between the second time period and the scheduled time, and wherein the second transmission frequency is higher than the first transmission frequency based at least in part on the amount of time between the first time period and the scheduled time being longer than the amount of time between the second time period and the scheduled time.

Aspect 5: The method of any of aspects 1-4, further comprising transmitting a cancellation indication corresponding to the reception announcement, wherein the cancellation indication indicates that one or more future resource reservations of the plurality of future resource reservations are cancelled.

Aspect 6: The method of aspect 5, wherein the cancellation indication comprises an identifier associated with the one or more future resource reservations.

Aspect 7: The method of aspect 6, wherein the identifier comprises a user equipment identifier corresponding to the wireless communication device.

Aspect 8: The method of any of aspects 5-7, wherein transmitting the reception announcement comprises transmitting the reception announcement using a beam having a first beam width, and wherein transmitting the cancellation indication comprises transmitting the cancellation indication using a beam having a second beam width, wherein the second beam width is larger than the first beam width.

Aspect 9: The method of any of aspects 5-8, further comprising: determining that a size of the one or more resource reservations satisfies a cancellation threshold; and transmitting an additional cancellation indication corresponding to the reception announcement based at least in part on determining that the size of the one or more resource reservations satisfies the cancellation threshold.

Aspect 10: The method of any of aspects 1-9, further comprising transmitting a preemption indication corresponding to the reception announcement, wherein the preemption indication indicates that one or more future resource reservations of the plurality of future reservations are preempted.

Aspect 11: The method of aspect 10, wherein transmitting the preemption indication comprises transmitting the preemption indication to the additional wireless communication device.

Aspect 12: The method of either of aspects 10 or 11, wherein the preemption indication indicates a reason for preemption of the one or more future resource reservations.

Aspect 13: The method any of aspects 10-12, wherein the preemption indication indicates that a set of resources associated with the one or more future resource reservations will be used by another wireless communication device.

Aspect 14: A method of wireless communication performed by a wireless communication device, comprising: receiving a reception announcement that indicates a plurality of future resource reservations; and communicating with an additional wireless communication device using a set of selected resources based at least in part on the plurality of future resource reservations.

Aspect 15: The method of aspect 14, wherein the plurality of future resource reservations comprises at least four future resource reservations.

Aspect 16: The method of either of aspects 14 or 15, further comprising: receiving, during a first time period and using a first transmission frequency, a first set of announcements associated with the plurality of future resource reservations, wherein a first resource reservation of the plurality of resource reservations corresponds to a scheduled time, and wherein the first set of announcements includes the reception announcement; and receiving, during a second time period and using a second transmission frequency that is different than the first transmission frequency, a second set of announcements associated with the plurality of future resource reservations, wherein the second transmission frequency is based at least in part on an amount of time between the second time period and the scheduled time.

Aspect 17: The method of aspect 16, wherein an amount of time between the first time period and the scheduled time is longer than the amount of time between the second time period and the scheduled time, and wherein the second transmission frequency is higher than the first transmission frequency based at least in part on the amount of time between the first time period and the scheduled time being longer than the amount of time between the second time period and the scheduled time.

Aspect 18: The method of any of aspects 14-17, further comprising receiving a cancellation indication corresponding to the reception announcement, wherein the cancellation indication indicates that one or more future resource reservations of the plurality of future resource reservations are cancelled.

Aspect 19: The method of aspect 18, wherein the cancellation indication comprises an identifier associated with the one or more future resource reservations.

Aspect 20: The method of aspect 19, wherein receiving the cancellation indication comprises receiving the cancellation indication from an additional wireless communication device, wherein the identifier comprises a user equipment identifier corresponding to the additional wireless communication device.

Aspect 21: The method of any of aspects 18-20, wherein receiving the reception announcement comprises receiving the reception announcement using a beam having a first beam width, and wherein receiving the cancellation indication comprises receiving the cancellation indication using a beam having a second beam width, wherein the second beam width is larger than the first beam width.

Aspect 22: The method of any of aspects 18-21, further comprising receiving an additional cancellation indication corresponding to the reception announcement based at least in part on a determination that a size of the one or more resource reservations satisfies a cancellation threshold.

Aspect 23: The method of any of aspects 14-22, further comprising receiving a preemption indication corresponding to the reception announcement, wherein the preemption indication indicates that one or more future resource reservations of the plurality of future reservations are preempted.

Aspect 24: The method of aspect 23, wherein receiving the preemption indication comprises receiving the preemption indication from the additional wireless communication device.

Aspect 25: The method of aspect 24, wherein the preemption indication indicates a reason for preemption of the one or more future resource reservations.

Aspect 26: The method of any of aspects 23-25, wherein the preemption indication indicates that a set of resources associated with the one or more future resource reservations will be used by another wireless communication device.

Aspect 27: A method of wireless communication performed by a wireless communication device, comprising: transmitting, during a first time period and using a first transmission frequency, a first set of announcements associated with at least one future communication, wherein the at least one future communication corresponds to at least one scheduled time; and transmitting, during a second time period and using a second transmission frequency that is different than the first transmission frequency, a second set of announcements associated with the at least one future communication, wherein the second transmission frequency is based at least in part on an amount of time between the second time period and the at least one scheduled time.

Aspect 28: The method of aspect 27, wherein the at least one future communication comprises a plurality of future communications, and wherein an announcement of the first set of announcements indicates the plurality of future communications.

Aspect 29: The method of aspect 28, wherein the plurality of future communications comprises at least four future communications.

Aspect 30: The method of any of aspects 27-29, wherein an announcement of the first set of announcements comprises a reception announcement.

Aspect 31: The method of any of aspects 27-30, wherein an amount of time between the first time period and the scheduled time is longer than the amount of time between the second time period and the scheduled time, and wherein the second transmission frequency is higher than the first transmission frequency based at least in part on the amount of time between the first time period and the scheduled time being longer than the amount of time between the second time period and the scheduled time.

Aspect 32: The method of any of aspects 27-31, further comprising transmitting a cancellation indication that indicates that one or more future communications of the at least one future communication are cancelled.

Aspect 33: The method of aspect 32, wherein the cancellation indication comprises an identifier associated with the one or more future communications.

Aspect 34: The method of aspect 33, wherein the identifier comprises a user equipment identifier corresponding to the wireless communication device.

Aspect 35: The method of any of aspects 32-34, wherein the cancellation indication corresponds to an announcement of the first set of announcements, wherein transmitting the first set of announcements comprises transmitting the announcement using a beam having a first beam width, and wherein transmitting the cancellation indication comprises transmitting the cancellation indication using a beam having a second beam width, wherein the second beam width is larger than the first beam width.

Aspect 36: The method of any of aspects 32-34, further comprising: determining that a size of a resource reservation associated with the one or more future communications satisfies a cancellation threshold; and transmitting an additional cancellation indication corresponding to the one or more future communications based at least in part on determining that the size of the resource reservation satisfies the cancellation threshold.

Aspect 37: The method of any of aspects 27-36, further comprising transmitting a preemption indication that indicates that a future resource reservation associated with the at least one future communication is preempted.

Aspect 38: The method of aspect 37, wherein the preemption indication indicates a reason for preemption of the future resource reservation.

Aspect 39: The method of either of aspects 37 and 38, wherein the preemption indication indicates that a set of resources associated with the future resource reservation will be used by another wireless communication device.

Aspect 40: A method of wireless communication performed by a wireless communication device, comprising: receiving, during a first time period and using a first transmission frequency, a first set of announcements associated with at least one future communication, wherein the at least one future communication corresponds to at least one scheduled time; and receiving, during a second time period and using a second transmission frequency that is different than the first transmission frequency, a second set of announcements associated with the at least one future communication, wherein the second transmission frequency is based at least in part on an amount of time between the second time period and the at least one scheduled time.

Aspect 41: The method of aspect 40, wherein the at least one future communication comprises a plurality of future communications, and wherein an announcement of the first set of announcements indicates the plurality of future communications.

Aspect 42: The method of aspect 41, wherein the plurality of future communications comprises at least four future communications.

Aspect 43: The method of any of aspects 40-42, wherein an announcement of the first set of announcements comprises a reception announcement.

Aspect 44: The method of any of aspects 40-41, wherein an amount of time between the first time period and the scheduled time is longer than the amount of time between the second time period and the scheduled time, and wherein the second transmission frequency is higher than the first transmission frequency based at least in part on the amount of time between the first time period and the scheduled time being longer than the amount of time between the second time period and the scheduled time.

Aspect 45: The method of any of aspects 40-44, further comprising receiving a cancellation indication that indicates that one or more future communications of the at least one future communication are cancelled.

Aspect 46: The method of aspect 45, wherein the cancellation indication comprises an identifier associated with the one or more future communications.

Aspect 47: The method of aspect 46, wherein the identifier comprises a user equipment identifier corresponding to the wireless communication device.

Aspect 48: The method of any of aspects 45-47, wherein the cancellation indication corresponds to an announcement of the first set of announcements, wherein receiving the first set of announcements comprises receiving the announcement using a beam having a first beam width, and wherein receiving the cancellation indication comprises receiving the cancellation indication using a beam having a second beam width, wherein the second beam width is larger than the first beam width.

Aspect 49: The method of any of aspects 45-48, further comprising receiving an additional cancellation indication corresponding to the one or more future communications based at least in part on a determination that a size of a resource reservation satisfies a cancellation threshold.

Aspect 50: The method of any of aspects 40-49, further comprising receiving a preemption indication that indicates that a future resource reservation associated with the at least one future communication is preempted.

Aspect 51: The method of aspect 50, wherein the preemption indication indicates a reason for preemption of the future resource reservation.

Aspect 52: The method of either of aspects 50 or 51, wherein the preemption indication indicates that a set of resources associated with the future resource reservation will be used by another wireless communication device.

Aspect 53: A method of wireless communication performed by a first wireless communication device, comprising: transmitting an announcement associated with a future communication and that indicates a reservation of a set of resources associated with the future communication; and transmitting a cancellation indication corresponding to the announcement, wherein the cancellation indication indicates that the future communication will not occur.

Aspect 54: The method of aspect 53, wherein the announcement comprises a reception announcement.

Aspect 55: The method of aspect 54, wherein the reception announcement indicates at least one additional set of resources associated with at least one additional future communication.

Aspect 56: The method of any of aspects 53-55, wherein the announcement comprises a transmission announcement.

Aspect 57: The method of any of aspects 53-56, wherein the transmission announcement indicates at least three additional sets of resources associated with at least three additional future communications.

Aspect 58: The method of any of aspects 53-57, wherein the cancellation indication comprises an identifier associated with the reservation.

Aspect 59: The method of aspect 58, wherein the identifier comprises a user equipment identifier corresponding to the wireless communication device.

Aspect 60: The method of any of aspects 53-59, wherein transmitting the announcement comprises transmitting the announcement using a beam having a first beam width, and wherein transmitting the cancellation indication comprises transmitting the cancellation indication using a beam having a second beam width, wherein the second beam width is larger than the first beam width.

Aspect 61: The method of any of aspects 53-60, further comprising: determining that a size of the reservation satisfies a cancellation threshold; and transmitting an additional cancellation indication corresponding to the announcement based at least in part on determining that the size of the reservation satisfies the cancellation threshold.

Aspect 62: The method of any of aspects 53-61, wherein the cancellation indication indicates the reservation.

Aspect 63: The method of any of aspects 53-62, further comprising: transmitting, during a first time period and using a first transmission frequency, a first set of announcements associated with a plurality of future communications, wherein a first future communication of the plurality of future communications corresponds to a scheduled time, and wherein the first set of announcements includes the announcement; and transmitting, during a second time period and using a second transmission frequency that is different than the first transmission frequency, a second set of announcements associated with the plurality of future communications, wherein the second transmission frequency is based at least in part on an amount of time between the second time period and the scheduled time.

Aspect 64: The method of aspect 63, wherein an amount of time between the first time period and the scheduled time is longer than the amount of time between the second time period and the scheduled time, and wherein the second transmission frequency is higher than the first transmission frequency based at least in part on the amount of time between the first time period and the scheduled time being longer than the amount of time between the second time period and the scheduled time.

Aspect 65: A method of wireless communication performed by a first wireless communication device, comprising: receiving an announcement associated with a future communication and that indicates a reservation of a set of resources associated with the future communication; and receiving a cancellation indication corresponding to the announcement, wherein the cancellation indication indicates that the future communication will not occur.

Aspect 66: The method of aspect 65, wherein the announcement comprises a reception announcement.

Aspect 67: The method of aspect 66, wherein the reception announcement indicates at least one additional set of resources associated with at least one additional future communication.

Aspect 68: The method of any of aspects 65-67, wherein the announcement comprises a transmission announcement.

Aspect 69: The method of aspect 68, wherein the transmission announcement indicates at least three additional sets of resources associated with at least three additional future communications.

Aspect 70: The method of any of aspects 65-69, wherein the cancellation indication comprises an identifier associated with the reservation.

Aspect 71: The method of aspect 70, wherein the identifier comprises a user equipment identifier corresponding to the wireless communication device.

Aspect 72: The method of any of aspects 65-71, wherein receiving the announcement comprises receiving the announcement using a beam having a first beam width, and wherein receiving the cancellation indication comprises receiving the cancellation indication using a beam having a second beam width, wherein the second beam width is larger than the first beam width.

Aspect 73: The method of any of aspects 65-72 further comprising receiving an additional cancellation indication corresponding to the announcement based at least in part on a determination that a size of the reservation satisfies a cancellation threshold.

Aspect 74: The method of any of aspects 65-73, wherein the cancellation indication indicates the reservation.

Aspect 75: The method of any of aspects 65-74, further comprising: receiving, during a first time period and using a first transmission frequency, a first set of announcements associated with a plurality of future communications, wherein a first future communication of the plurality of future communications corresponds to a scheduled time, and wherein the first set of announcements includes the announcement; and receiving, during a second time period and using a second transmission frequency that is different than the first transmission frequency, a second set of announcements associated with the plurality of future communications, wherein the second transmission frequency is based at least in part on an amount of time between the second time period and the scheduled time.

Aspect 76: The method of aspect 75, wherein an amount of time between the first time period and the scheduled time is longer than the amount of time between the second time period and the scheduled time, and wherein the second transmission frequency is higher than the first transmission frequency based at least in part on the amount of time between the first time period and the scheduled time being longer than the amount of time between the second time period and the scheduled time.

Aspect 77: A method of wireless communication performed by a first wireless communication device, comprising: transmitting an announcement that indicates a reservation of a set of resources associated with a future communication between the first wireless communication device and a second wireless communication device; and transmitting a preemption indication corresponding to the announcement, wherein the preemption indication indicates that the future communication will not occur.

Aspect 78: The method of aspect 77, wherein transmitting the preemption indication comprises transmitting the preemption indication to the second wireless communication device.

Aspect 79: The method of either of aspects 77 or 78, wherein the preemption indication indicates a reason for preemption of the future communication.

Aspect 80: The method of any of aspects 77-79, wherein the preemption indication indicates that the set of resources will be used to communicate with a third wireless communication device.

Aspect 81: The method of any of aspects 77-80, wherein the announcement comprises a reception announcement.

Aspect 82: The method of aspect 81, wherein the reception announcement indicates at least one additional set of resources associated with at least one additional future communication.

Aspect 83: The method of any of aspects 77-82, wherein the announcement comprises a transmission announcement.

Aspect 84: The method of aspect 83, wherein the transmission announcement indicates at least three additional sets of resources associated with at least three additional future communications.

Aspect 85: The method of any of aspects 77-84, further comprising: transmitting, during a first time period and using a first transmission frequency, a first set of announcements associated with a plurality of future communications, wherein a first future communication of the plurality of future communications corresponds to a scheduled time, and wherein the first set of announcements includes the announcement; and transmitting, during a second time period and using a second transmission frequency that is different than the first transmission frequency, a second set of announcements associated with the plurality of future communications, wherein the second transmission frequency is based at least in part on an amount of time between the second time period and the scheduled time.

Aspect 86: The method of aspect 85, wherein an amount of time between the first time period and the scheduled time is longer than the amount of time between the second time period and the scheduled time, and wherein the second transmission frequency is higher than the first transmission frequency based at least in part on the amount of time between the first time period and the scheduled time being longer than the amount of time between the second time period and the scheduled time.

Aspect 87: A method of wireless communication performed by a first wireless communication device, comprising: receiving an announcement that indicates a reservation of a set of resources associated with a future communication between the first wireless communication device and a second wireless communication device; and receiving a preemption indication corresponding to the announcement, wherein the preemption indication indicates that the future communication will not occur.

Aspect 88: The method of aspect 87, wherein receiving the preemption indication comprises receiving the preemption indication from the second wireless communication device.

Aspect 89: The method of either of aspects 87 or 88, wherein the preemption indication indicates a reason for preemption of the future communication.

Aspect 90: The method of any of aspects 87-89, wherein the preemption indication indicates that the set of resources will be used to communicate with a third wireless communication device.

Aspect 91: The method of any of aspects 87-90, wherein the announcement comprises a reception announcement.

Aspect 92: The method of aspect 91, wherein the reception announcement indicates at least one additional set of resources associated with at least one additional future communication.

Aspect 93: The method of any of aspects 87-92, wherein the announcement comprises a transmission announcement.

Aspect 94: The method of aspect 93, wherein the transmission announcement indicates at least three additional sets of resources associated with at least three additional future communications.

Aspect 95: The method of any of aspects 87-94, further comprising: receiving, during a first time period and using a first transmission frequency, a first set of announcements associated with a plurality of future communications, wherein a first future communication of the plurality of future communications corresponds to a scheduled time, and wherein the first set of announcements includes the announcement; and receiving, during a second time period and using a second transmission frequency that is different than the first transmission frequency, a second set of announcements associated with the plurality of future communications, wherein the second transmission frequency is based at least in part on an amount of time between the second time period and the scheduled time.

Aspect 96: The method of any of aspects 87-95, wherein an amount of time between the first time period and the scheduled time is longer than the amount of time between the second time period and the scheduled time, and wherein the second transmission frequency is higher than the first transmission frequency based at least in part on the amount of time between the first time period and the scheduled time being longer than the amount of time between the second time period and the scheduled time.

Aspect 97: An apparatus for wireless communication at a device, comprising a processor; memory coupled with the processor; and instructions stored in the memory and executable by the processor to cause the apparatus to perform the method of one or more aspects of aspects 1-13.

Aspect 98: A device for wireless communication, comprising a memory and one or more processors coupled to the memory, the memory and the one or more processors configured to perform the method of one or more aspects of aspects 1-13.

Aspect 99: An apparatus for wireless communication, comprising at least one means for performing the method of one or more aspects of aspects 1-13.

Aspect 100: A non-transitory computer-readable medium storing code for wireless communication, the code comprising instructions executable by a processor to perform the method of one or more aspects of aspects 1-13.

Aspect 101: A non-transitory computer-readable medium storing a set of instructions for wireless communication, the set of instructions comprising one or more instructions that, when executed by one or more processors of a device, cause the device to perform the method of one or more aspects of aspects 1-13.

Aspect 102: An apparatus for wireless communication at a device, comprising a processor; memory coupled with the processor; and instructions stored in the memory and executable by the processor to cause the apparatus to perform the method of one or more aspects of aspects 14-26.

Aspect 103: A device for wireless communication, comprising a memory and one or more processors coupled to the memory, the memory and the one or more processors configured to perform the method of one or more aspects of aspects 14-26.

Aspect 104: An apparatus for wireless communication, comprising at least one means for performing the method of one or more aspects of aspects 14-26.

Aspect 105: A non-transitory computer-readable medium storing code for wireless communication, the code comprising instructions executable by a processor to perform the method of one or more aspects of aspects 14-26.

Aspect 106: A non-transitory computer-readable medium storing a set of instructions for wireless communication, the set of instructions comprising one or more instructions that, when executed by one or more processors of a device, cause the device to perform the method of one or more aspects of aspects 14-26.

Aspect 107: An apparatus for wireless communication at a device, comprising a processor; memory coupled with the processor; and instructions stored in the memory and executable by the processor to cause the apparatus to perform the method of one or more aspects of aspects 27-39.

Aspect 108: A device for wireless communication, comprising a memory and one or more processors coupled to the memory, the memory and the one or more processors configured to perform the method of one or more aspects of aspects 27-39.

Aspect 109: An apparatus for wireless communication, comprising at least one means for performing the method of one or more aspects of aspects 27-39.

Aspect 110: A non-transitory computer-readable medium storing code for wireless communication, the code comprising instructions executable by a processor to perform the method of one or more aspects of aspects 27-39.

Aspect 111: A non-transitory computer-readable medium storing a set of instructions for wireless communication, the set of instructions comprising one or more instructions that, when executed by one or more processors of a device, cause the device to perform the method of one or more aspects of aspects 27-39.

Aspect 112: An apparatus for wireless communication at a device, comprising a processor; memory coupled with the processor; and instructions stored in the memory and executable by the processor to cause the apparatus to perform the method of one or more aspects of aspects 40-52.

Aspect 113: A device for wireless communication, comprising a memory and one or more processors coupled to the memory, the memory and the one or more processors configured to perform the method of one or more aspects of aspects 40-52.

Aspect 114: An apparatus for wireless communication, comprising at least one means for performing the method of one or more aspects of aspects 40-52.

Aspect 115: A non-transitory computer-readable medium storing code for wireless communication, the code comprising instructions executable by a processor to perform the method of one or more aspects of aspects 40-52.

Aspect 116: A non-transitory computer-readable medium storing a set of instructions for wireless communication, the set of instructions comprising one or more instructions that, when executed by one or more processors of a device, cause the device to perform the method of one or more aspects of aspects 40-52.

Aspect 117: An apparatus for wireless communication at a device, comprising a processor; memory coupled with the processor; and instructions stored in the memory and executable by the processor to cause the apparatus to perform the method of one or more aspects of aspects 53-64.

Aspect 118: A device for wireless communication, comprising a memory and one or more processors coupled to the memory, the memory and the one or more processors configured to perform the method of one or more aspects of aspects 53-64.

Aspect 119: An apparatus for wireless communication, comprising at least one means for performing the method of one or more aspects of aspects 53-64.

Aspect 120: A non-transitory computer-readable medium storing code for wireless communication, the code comprising instructions executable by a processor to perform the method of one or more aspects of aspects 53-64.

Aspect 121: A non-transitory computer-readable medium storing a set of instructions for wireless communication, the set of instructions comprising one or more instructions that, when executed by one or more processors of a device, cause the device to perform the method of one or more aspects of aspects 53-64.

Aspect 122: An apparatus for wireless communication at a device, comprising a processor; memory coupled with the processor; and instructions stored in the memory and executable by the processor to cause the apparatus to perform the method of one or more aspects of aspects 65-76.

Aspect 123: A device for wireless communication, comprising a memory and one or more processors coupled to the memory, the memory and the one or more processors configured to perform the method of one or more aspects of aspects 65-76.

Aspect 124: An apparatus for wireless communication, comprising at least one means for performing the method of one or more aspects of aspects 65-76.

Aspect 125: A non-transitory computer-readable medium storing code for wireless communication, the code comprising instructions executable by a processor to perform the method of one or more aspects of aspects 65-76.

Aspect 126: A non-transitory computer-readable medium storing a set of instructions for wireless communication, the set of instructions comprising one or more instructions that, when executed by one or more processors of a device, cause the device to perform the method of one or more aspects of aspects 65-76.

Aspect 127: An apparatus for wireless communication at a device, comprising a processor; memory coupled with the processor; and instructions stored in the memory and executable by the processor to cause the apparatus to perform the method of one or more aspects of aspects 77-86.

Aspect 128: A device for wireless communication, comprising a memory and one or more processors coupled to the memory, the memory and the one or more processors configured to perform the method of one or more aspects of aspects 77-86.

Aspect 129: An apparatus for wireless communication, comprising at least one means for performing the method of one or more aspects of aspects 77-86.

Aspect 130: A non-transitory computer-readable medium storing code for wireless communication, the code comprising instructions executable by a processor to perform the method of one or more aspects of aspects 77-86.

Aspect 131: A non-transitory computer-readable medium storing a set of instructions for wireless communication, the set of instructions comprising one or more instructions that, when executed by one or more processors of a device, cause the device to perform the method of one or more aspects of aspects 77-86.

Aspect 132: An apparatus for wireless communication at a device, comprising a processor; memory coupled with the processor; and instructions stored in the memory and executable by the processor to cause the apparatus to perform the method of one or more aspects of aspects 87-96.

Aspect 133: A device for wireless communication, comprising a memory and one or more processors coupled to the memory, the memory and the one or more processors configured to perform the method of one or more aspects of aspects 87-96.

Aspect 134: An apparatus for wireless communication, comprising at least one means for performing the method of one or more aspects of aspects 87-96.

Aspect 135: A non-transitory computer-readable medium storing code for wireless communication, the code comprising instructions executable by a processor to perform the method of one or more aspects of aspects 87-96.

Aspect 136: A non-transitory computer-readable medium storing a set of instructions for wireless communication, the set of instructions comprising one or more instructions that, when executed by one or more processors of a device, cause the device to perform the method of one or more aspects of aspects 87-96.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:
    a memory; and
    one or more processors coupled to the memory, the one or more processors configured to:
        transmit, during a first time period and using a first transmission frequency, a first set of announcements associated with a plurality of future reserved resources, wherein a first reserved resource of the plurality of future reserved resources corresponds to a scheduled time, and wherein the first set of announcements includes a reception announcement that indicates the plurality of future reserved resources;

transmit, during a second time period and using a second transmission frequency that is different than the first transmission frequency, a second set of announcements associated with the plurality of future reserved resources, wherein the second transmission frequency is based at least in part on an amount of time between the second time period and the scheduled time; and receive at least one communication from an additional wireless communication device using at least one of the plurality of future reserved resources.

2. The wireless communication device of claim 1, wherein the plurality of future reserved resources comprises at least four future reserved resources.

3. The wireless communication device of claim 1, wherein an amount of time between the first time period and the scheduled time is longer than the amount of time between the second time period and the scheduled time, and
wherein the second transmission frequency is higher than the first transmission frequency based at least in part on the amount of time between the first time period and the scheduled time being longer than the amount of time between the second time period and the scheduled time.

4. The wireless communication device of claim 1, wherein the one or more processors are further configured to transmit a cancellation indication corresponding to the reception announcement, wherein the cancellation indication indicates that one or more future reserved resources of the plurality of future reserved resources are cancelled.

5. The wireless communication device of claim 4, wherein the cancellation indication comprises an identifier associated with the one or more future reserved resources.

6. The wireless communication device of claim 5, wherein the identifier comprises a user equipment identifier corresponding to the wireless communication device.

7. The wireless communication device of claim 4, wherein the one or more processors, when transmitting the reception announcement, are configured to transmit the reception announcement using a beam having a first beam width, and
wherein transmitting the cancellation indication comprises transmitting the cancellation indication using a beam having a second beam width, wherein the second beam width is larger than the first beam width.

8. The wireless communication device of claim 4, wherein the one or more processors are further configured to:
determine that a size of the one or more reserved resources satisfies a cancellation threshold; and
transmit an additional cancellation indication corresponding to the reception announcement based at least in part on determining that the size of the one or more reserved resources satisfies the cancellation threshold.

9. The wireless communication device of claim 1, wherein the one or more processors are further configured to transmit a preemption indication corresponding to the reception announcement, wherein the preemption indication indicates that one or more future reserved resources of the plurality of future reserved resources are preempted.

10. The wireless communication device of claim 9, wherein transmitting the preemption indication corresponds transmitting the preemption indication to the additional wireless communication device.

11. The wireless communication device of claim 9, wherein the preemption indication indicates a reason for preemption of the one or more future reserved resources.

12. The wireless communication device of claim 9, wherein the preemption indication indicates that a set of resources associated with the one or more future reserved resources will be used by another wireless communication device.

13. A wireless communication device for wireless communication, comprising:
a memory; and
one or more processors operatively coupled to the memory, the memory and the one or more processors configured to:
transmit, during a first time period and using a first transmission frequency, a first set of announcements associated with at least one future communication, wherein the at least one future communication corresponds to at least one scheduled time; and
transmit, during a second time period and using a second transmission frequency that is different than the first transmission frequency, a second set of announcements associated with the at least one future communication, wherein the second transmission frequency is based at least in part on an amount of time between the second time period and the at least one scheduled time.

14. The wireless communication device of claim 13, wherein an announcement of the first set of announcements indicates a number of future communications of the at least one future communication.

15. The wireless communication device of claim 14, wherein the number of future communications indicated by the announcement is at least four.

16. The wireless communication device of claim 13, wherein an announcement of the first set of announcements comprises a reception announcement.

17. The wireless communication device of claim 13, wherein an amount of time between the first time period and the scheduled time is longer than the amount of time between the second time period and the scheduled time, and
wherein the second transmission frequency is higher than the first transmission frequency based at least in part on the amount of time between the first time period and the scheduled time being longer than the amount of time between the second time period and the scheduled time.

18. A first wireless communication device for wireless communication, comprising:
a memory; and
one or more processors coupled to the memory, the one or more processors configured to:
transmit, using a first beam having a first beam width, an announcement associated with a future communication and that indicates a set of reserved resources associated with the future communication; and
transmit, using a second beam having a second beam width that is larger than the first beam width, a cancellation indication corresponding to the announcement, wherein the cancellation indication indicates that the future communication will not occur.

19. The first wireless communication device of claim 18, wherein the announcement comprises a reception announcement.

20. The first wireless communication device of claim 18, wherein the announcement comprises a transmission announcement.

21. The first wireless communication device of claim 18, wherein the cancellation indication comprises an identifier associated with the reserved resources.

22. The first wireless communication device of claim 21, wherein the identifier comprises a user equipment identifier corresponding to the first wireless communication device.

23. The first wireless communication device of claim 18, wherein the one or more processors are further configured to:
   determine that a size of the reserved resources satisfies a cancellation threshold; and
   transmit an additional cancellation indication corresponding to the announcement based at least in part on determining that the size of the reserved resources satisfies the cancellation threshold.

24. The first wireless communication device of claim 18, wherein the cancellation indication indicates the reserved resources.

25. A first wireless communication device for wireless communication, comprising:
   a memory; and
   one or more processors coupled to the memory, the one or more processors configured to:
      transmit an announcement that indicates a set of reserved resources associated with a future communication between the first wireless communication device and a second wireless communication device; and
      transmit a preemption indication corresponding to the announcement, wherein the preemption indication indicates that the future communication will not occur and that the set of reserved resources will be used by a third wireless communication device different than the first wireless communication device and the second wireless communication device.

26. The first wireless communication device of claim 25, wherein transmitting the preemption indication corresponds transmitting the preemption indication to the second wireless communication device.

27. The first wireless communication device of claim 25, wherein the preemption indication indicates a reason for preemption of the future communication.

28. The first wireless communication device of claim 25, wherein the preemption indication indicates that the set of reserved resources will be used for a preempting communication associated with the third wireless communication device.

29. The first wireless communication device of claim 28, wherein the future communication is scheduled to use a first beam and the preempting communication is scheduled to use a second beam different than the first beam.

30. The first wireless communication device of claim 25, wherein, to transmit the preemption indication, the one or more processors are configured to:
   transmit the preemption indication to the second wireless communication device and one or more additional wireless communication devices.

* * * * *